(12) United States Patent
Iizuka et al.

(10) Patent No.: US 9,571,365 B2
(45) Date of Patent: Feb. 14, 2017

(54) MONITORING APPARATUS AND METHOD FOR DETERMINATION OF LOCATION OF PACKET LOSS

(71) Applicant: FUJITSU LIMITED, Kawasaki-shi, Kanagawa (JP)

(72) Inventors: Fumiyuki Iizuka, Kawasaki (JP); Yuji Nomura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 133 days.

(21) Appl. No.: 13/906,754

(22) Filed: May 31, 2013

(65) Prior Publication Data

US 2014/0064119 A1    Mar. 6, 2014

(30) Foreign Application Priority Data

Aug. 29, 2012   (JP) .................................. 2012-188996

(51) Int. Cl.
    *H04L 12/16*       (2006.01)
    *H04L 12/26*       (2006.01)
(52) U.S. Cl.
    CPC .................................. *H04L 43/0829* (2013.01)
(58) Field of Classification Search
    CPC .................... H04L 2012/5636; H04L 41/0659; H04L 43/00; H04L 43/08; H04L 43/12; H04L 47/11
    See application file for complete search history.

(56) References Cited

U.S. PATENT DOCUMENTS

| 5,539,747 A * | 7/1996 | Ito ....................... H04L 12/5602 370/235 |
| 2005/0063302 A1 * | 3/2005 | Samuels et al. .............. 370/229 |
| 2006/0045008 A1 * | 3/2006 | Sun ........................ H04L 47/10 370/229 |
| 2006/0045017 A1 | 3/2006 | Yamasaki |
| 2006/0285500 A1 * | 12/2006 | Booth et al. .................. 370/250 |
| 2007/0206497 A1 * | 9/2007 | Plamondon et al. ......... 370/231 |

(Continued)

FOREIGN PATENT DOCUMENTS

| JP | 2006-67217 | 3/2006 |
| JP | 2012-95190 | 5/2012 |

OTHER PUBLICATIONS

Japanese Office Action mailed Feb. 2, 2016 in corresponding Japanese Patent Application No. 2012-188996, 3 pages.

*Primary Examiner* — Gary Mui
*Assistant Examiner* — Stephen Steiner
(74) *Attorney, Agent, or Firm* — Staas & Halsey LLP

(57) ABSTRACT

A monitoring apparatus includes a memory, and a processor coupled to the memory and configured to receive plural acknowledgment packets each including an identifier for identifying a packet and information indicating selective acknowledgment which are transmitted from a reception node that has received a data packet transmitted from a transmission node via a network to the transmission node via the network, and determine that a data packet loss occurs in the reception node in a case where a first identifier and first information included in a first acknowledgment packet among the plural acknowledgment packets are respectively matched with a second identifier and second information included in a second acknowledgment packet received after the first acknowledgment packet among the plural acknowledgment packets.

18 Claims, 16 Drawing Sheets

(56) References Cited

U.S. PATENT DOCUMENTS

2008/0186863 A1* 8/2008 Baratakke et al. ............ 370/237
2009/0059928 A1* 3/2009 Enomoto et al. .............. 370/394
2009/0262743 A1* 10/2009 Uyehara et al. .............. 370/394
2010/0014419 A1 1/2010 Lee et al.
2012/0106376 A1 5/2012 Kikkawa et al.

* cited by examiner

| SESSION ID | TRANSMISSION SOURCE IP ADDRESS | TRANSMISSION SOURCE PORT NUMBER | TRANSMISSION DESTINATION IP ADDRESS | TRANSMISSION DESTINATION PORT NUMBER | MAXIMUM SEQUENCE NUMBER | ACK EXPECTED NUMBER | REDUNDANT ACK NUMBER | MAXIMUM ACK NUMBER |
|---|---|---|---|---|---|---|---|---|
| 1-1 | a1.b1.c1.d1 | p1 | a2.b2.c2.d2 | p2 | 0 | × | × | × |
| 1-2 | a2.b2.c2.d2 | p2 | a1.b1.c1.d1 | p1 | × | 0 | 0 | 0 |
| ... | ... | ... | ... | ... | ... | ... | ... | ... |

T1b

| SESSION ID | SACK BLOCK | RECEPTION NODE LOSS POSSIBILITY RANGE | RECEPTION NODE LOSS RANGE | WINDOW SIZE | MAXIMUM LENGTH |
|---|---|---|---|---|---|
| 1-1 | × | 0 | × | × 0 | 0 |
| 1-2 | 0 | × | 0 | × | × |
| ... | ... | ... | ... | ... | ... |

| TIME AND DATE | SESSION ID | PACKET NUMBER | NETWORK LOSS NUMBER | RECEPTION NODE LOSS NUMBER | RETRANSMISSION NUMBER |
|---|---|---|---|---|---|
| 2012/1/10 0:00 | 1 | 13 | 3 | 1 | 1 |
| 2012/1/10 0:00 | 2 | ... | ... | ... | ... |
| 2012/1/10 0:01 | 1 | ... | ... | ... | ... |
| 2012/1/10 0:01 | 2 | ... | ... | ... | ... |
| ... | ... | ... | ... | ... | ... |

FIG. 6

| SEQUENCE NUMBER OF TRANSMISSION PACKET | ACK | SACK 1st BLOCK | | SACK 2nd BLOCK | |
|---|---|---|---|---|---|
| | | LEFT | RIGHT | LEFT | RIGHT |
| 1001 | | | | | |
| | 1101 | | | | |
| 1101 | | | | | |
| | 1201 | | | | |
| 1201 (LOSS) | | | | | |
| 1301 | | | | | |
| | 1201 | 1301 | 1401 | | |
| 1401 | | | | | |
| | 1201 | 1301 | 1501 | | |
| 1501 (LOSS) | | | | | |
| 1601 | | | | | |
| | 1201 | 1601 | 1701 | 1301 | 1501 |
| 1201 (RETRANSMISSION) | | | | | |
| | 1501 | 1601 | 1701 | | |
| 1501 (RETRANSMISSION) | | | | | |
| | 1701 | | | | |
| 1701 | | | | | |
| | 1801 | | | | |

| SEQUENCE NUMBER OF TRANSMISSION PACKET | ACK | SACK 1st BLOCK | | RECEPTION NODE LOSS POSSIBILITY RANGE | RECEPTION NODE LOSS RANGE | LOSS DETERMINATION |
|---|---|---|---|---|---|---|
| | | LEFT | RIGHT | | | |
| 1001 (NW LOSS) | | | | | | |
| 1101 | | | | | | |
| | 1001 | 1101 | 1201 | | | |
| 1201 | | | | | | |
| | 1001 | 1101 | 1301 | | | |
| 1301 | | | | | | |
| | 1001 | 1101 | 1401 | | | |
| 1401 | | | | | | |
| | 1001 | 1101 | 1501 | | | |
| 1501 | | | | | | |
| | 1001 | 1101 | 1601 | | | |
| 1601 | | | | | | |
| | 1001 | 1101 | 1701 | | | |
| 1701 | | | | | | |
| | 1001 | 1101 | 1801 | | | |
| 1801 | | | | | | |
| | 1001 | 1101 | 1901 | | | |
| 1901 | | | | | | |
| | 1001 | 1101 | 2001 | | | |
| 2001 (RECEPTION LOSS) | | | | 2001-2101 | | |
| | 1001 | 1101 | 2001 | 2001-2101 | 2001-2101 | |
| 2101 (RECEPTION LOSS) | | | | 2001-2201 | 2001-2101 | |
| | 1001 | 1101 | 2001 | 2001-2201 | 2001-2201 | |
| 2201 (RECEPTION LOSS) | | | | 2001-2301 | 2001-2201 | |
| | 1001 | 1101 | 2001 | 2001-2301 | 2001-2301 | |
| 2301 (RECEPTION LOSS) | | | | 2001-2401 | 2001-2301 | |
| | 1001 | 1101 | 2001 | 2001-2401 | 2001-2401 | |
| 1001 (RETRANSMISSION) | | | | 2001-2401 | 2001-2401 | NW LOSS |
| | 2001 | | | 2001-2401 | 2001-2401 | |
| 2401 | | | | 2001-2401 | 2001-2401 | |
| | 2001 | 2401 | 2501 | 2001-2401 | 2001-2401 | |
| 2501 | | | | 2001-2401 | 2001-2401 | |
| | 2001 | 2401 | 2601 | 2001-2401 | 2001-2401 | |

FIG. 12

| SEQUENCE NUMBER OF TRANSMISSION PACKET | ACK | SACK 1st BLOCK | | RECEPTION NODE LOSS POSSIBILITY RANGE | RECEPTION NODE LOSS RANGE | LOSS DETERMINATION |
|---|---|---|---|---|---|---|
| | | LEFT | RIGHT | | | |
| 2601 | | | | 2001-2401 | 2001-2401 | |
| | 2001 | 2401 | 2701 | 2001-2401 | 2001-2401 | |
| 2001 (RETRANSMISSION) | | | | 2001-2401 | 2001-2401 | RECEPTION LOSS |
| | 2101 | 2401 | 2701 | 2101-2401 | 2101-2401 | |
| 2101 (RETRANSMISSION) | | | | 2101-2401 | 2101-2401 | RECEPTION LOSS |
| | 2201 | 2401 | 2701 | 2201-2401 | 2201-2401 | |
| 2201 (RETRANSMISSION) | | | | 2201-2401 | 2201-2401 | RECEPTION LOSS |
| | 2301 | 2401 | 2701 | 2301-2401 | 2301-2401 | |
| 2301 (RETRANSMISSION) | | | | 2301-2401 | 2301-2401 | RECEPTION LOSS |
| | 2701 | | | | | |
| | | | | | | |
| | | | | | | |

| SEQUENCE NUMBER OF TRANSMISSION PACKET | ACK | SACK 1st BLOCK LEFT | SACK 1st BLOCK RIGHT | SACK 2nd BLOCK LEFT | SACK 2nd BLOCK RIGHT | RECEPTION NODE LOSS POSSIBILITY RANGE | RECEPTION NODE LOSS RANGE | LOSS DETERMINATION |
|---|---|---|---|---|---|---|---|---|
| 1001 (NW LOSS) | | | | | | | | |
| 1101 | | | | | | | | |
| | 1001 | 1101 | 1201 | | | | | |
| 1201 | | | | | | | | |
| | 1001 | 1101 | 1301 | | | | | |
| 1301 | | | | | | | | |
| | 1001 | 1101 | 1401 | | | | | |
| 1401 | | | | | | | | |
| | 1001 | 1101 | 1501 | | | | | |
| 1501 | | | | | | | | |
| | 1001 | 1101 | 1601 | | | | | |
| 1601 | | | | | | | | |
| | 1001 | 1101 | 1701 | | | | | |
| 1701 | | | | | | | | |
| | 1001 | 1101 | 1801 | | | | | |
| 1801 | | | | | | | | |
| | 1001 | 1101 | 1901 | | | | | |
| 1901 | | | | | | | | |
| | 1001 | 1101 | 2001 | | | | | |
| 2001 (NW LOSS) | | | | | | | | |
| 2101 | | | | | | | | |
| | 1001 | 2101 | 2201 | 1101 | 2001 | | | |
| 2201 | | | | | | | | |
| | 1001 | 2101 | 2301 | 1101 | 2001 | | | |
| 2301 | | | | | | | | |
| | 1001 | 2101 | 2401 | 1101 | 2001 | | | |
| 1001 (RETRANSMISSION) | | | | | | | | NW LOSS |
| | 2001 | 2101 | 2401 | | | | | |
| 2401 | | | | | | | | |
| | 2001 | 2401 | 2501 | | | | | |
| 2501 | | | | | | | | |
| | 2001 | 2401 | 2601 | | | | | |
| 2601 | | | | | | | | |
| | 2001 | 2401 | 2701 | | | | | |
| 2001 (RETRANSMISSION) | | | | | | | | NW LOSS |
| | 2701 | | | | | | | |
| | | | | | | | | |

MONITORING APPARATUS AND METHOD FOR DETERMINATION OF LOCATION OF PACKET LOSS

CROSS-REFERENCE TO RELATED APPLICATION

This application is based upon and claims the benefit of priority of the prior Japanese Patent Application No. 2012-188996, filed on Aug. 29, 2012, the entire contents of which are incorporated herein by reference.

FIELD

The embodiments discussed herein are related to a monitoring apparatus, a recording medium, and a monitoring method.

BACKGROUND

In a system including a communication apparatus on a transmission side, a communication apparatus on a reception side, and a network that connects both the communication apparatuses to each other, a packet transmitted from the communication apparatus on the transmission side to the communication apparatus on the reception side may be lost in some cases. For this reason, an apparatus configured to detect a packet loss occurring in the network has been proposed. Hereinafter, the communication apparatus on the transmission side is appropriately referred to as transmission node, and the communication apparatus on the reception side is appropriately referred to as reception node. The proposed apparatus is provided between the transmission node and the reception node and monitors a packet transmitted and received between the transmission node and the reception node to detect the packet loss in the network.

A case may also occur where the packet has been lost in the reception node besides the above-mentioned case where the packet has been lost in the network. An example of the case where the packet has been lost in the reception node is a case where even when the reception node normally has received the packet, the received packet is discarded. An administrator of a communication system (hereinafter, which will be appropriately referred to as administrator) is to perform so-called determining failure to determine whether the packet has been lost in the network or the packet has been lost in the reception node and prepare accurate failure countermeasures. This is because the administrator is to perform mutually different failure countermeasures in the case of the packet loss in the network and the case of the packet loss in the reception node.

Japanese National Publication of International Patent Application No. 2010-512090 has been proposed in related art.

SUMMARY

According to an aspect of the invention, a monitoring apparatus includes a memory and a processor coupled to the memory. The processor is configured to receive plural acknowledgment packets each including an identifier for identifying a packet and information indicating selective acknowledgment which are transmitted from a reception node that has received a data packet transmitted from a transmission node via a network to the transmission node via the network, and determine that a data packet loss occurs in the reception node in a case where a first identifier and first information included in a first acknowledgment packet among the plural acknowledgment packets are respectively matched with a second identifier and second information included in a second acknowledgment packet received after the first acknowledgment packet among the plural acknowledgment packets.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates a session information management table example of FIG. 1;

FIG. 6 is an explanatory diagram for describing a sequence number, ACK, and SACK;

FIG. 11 is a first explanatory diagram for describing processing executed by the monitoring apparatus in the first specific example;

FIG. 12 is a second explanatory diagram for describing the processing executed by the monitoring apparatus in the first specific example;

FIG. 14 is an explanatory diagram for describing processing executed by the monitoring apparatus in the second specific example;

DESCRIPTION OF EMBODIMENTS

System

Figure 1:
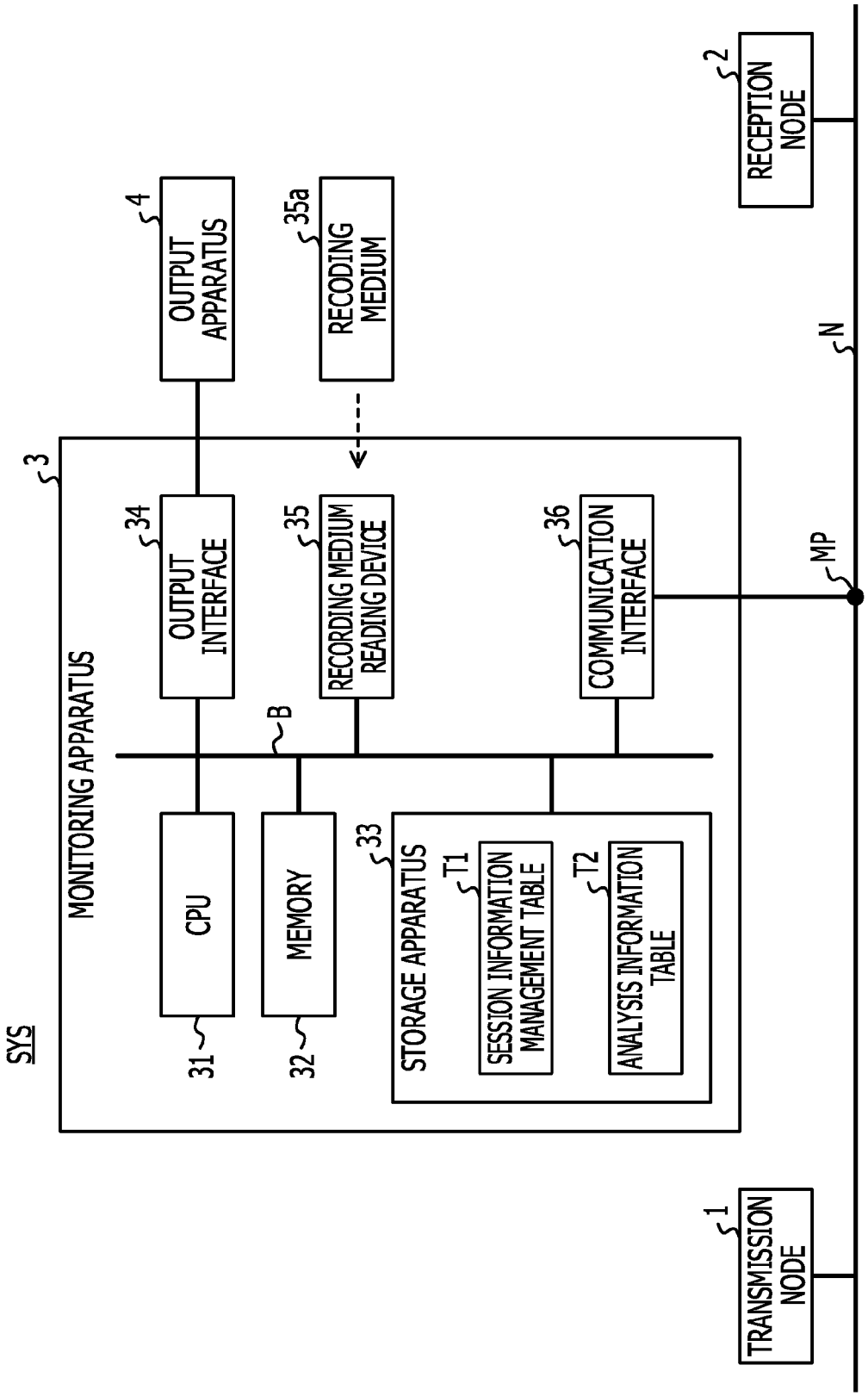
FIG. 1 is a hardware block diagram example for describing a configuration of a network system.

FIG. 1 is a hardware block diagram example for describing a configuration of a network system SYS. The network system SYS includes a transmission node 1, a reception node 2, a monitoring apparatus 3, and a network N. The transmission node 1 is also referred to as communication apparatus on a transmission side and is composed, for example, of a server apparatus. The reception node 2 is also referred to as communication apparatus on a reception side and is composed, for example, of a terminal apparatus. The network N is, for example, a local area network (LAN). The network N is not limited to a wired network but may also be a wireless network.

Next, the transmission node 1 and the reception node 2 will be described. The transmission node 1 transmits a packet to the reception node 2, and the reception node 2 receives the packet transmitted from the transmission node 1. The reception node 2 then transmits a response packet to the transmission node 1 in response to the packet reception. This response packet includes, for example, a positive acknowledgment (ACK) packet. The transmission node 1 and the reception node 2 execute packet transmission and reception, for example, on the basis of Transmission Control Protocol/Internet Protocol (TCP/IP).

When a transmission packet is to be created, the transmission node 1 generates a sequence number that uniquely identifies data from what byte of all transmission data is included in this transmission packet and stores the sequence number in the transmission packet. Hereinafter, the transmission packet transmitted from the transmission node 1 to the reception node 2 will be appropriately referred to as data packet. When the data packet has normally been received, the reception node 2 transmits an ACK packet having an ACK number indicating a number obtained by adding the sequence number of the data packet to a packet size of the data packet. This ACK number is an example of an identifier for identifying the packet that identifies the ACK packet. In other words, the ACK number is also a number for specifying the data that the reception node 2 requests the transmission node 1 to transmit.

When the ACK packet has been received, the transmission node 1 transmits the data packet having the sequence number corresponding to the ACK number of the ACK packet to the reception node 2. When the transmission node 1 transmits the data packet to the reception node 2, the data packet may be lost in the network, which is a first case, and the data packet may be lost in the reception node 2, which is a second case.

Reasons for the occurrence of the first case include, for example, the following two causes. A first cause is a failure of a network device such as, for example, a communication cable, a network interface card, a repeater, or a hub. In this case, for example, a communication device such as the repeater does not fully send (also referred to as transmit) all the data in the single data packet 1 to the end, and as a result, the packet loss occurs. In addition, if a radio wave status is faulty in a case where a wireless communication is executed the network devices, a packet transmission failure is caused, and the packet loss occurs.

A second cause is a buffer capacity shortage or throughput insufficiency of the network device. In this case, for example, if the network devices suffer congestion, the data packet is discarded because of the buffer capacity shortage or throughput insufficiency. As a result, the packet loss occurs. In this case, in addition to the above, if the administrator sets an inappropriate parameter in the communication device, the packet loss occurs because of generated collision or broadcast stream.

A reason for the occurrence of the second case includes, for example, a buffer capacity shortage for received packets in the reception node 2. In this case, for example, if the transmission node 1 continuously transmits packets more than the buffer capacity for the received packets of the reception node 2, the buffer capacity for the received packets runs short, and the reception node 2 may discard the normally received packets. In addition to the above, the reception node 2 may discard the normally received packets because of a defect (also referred to as bug) of a communication program executed by the reception node 2. As a result, the packet loss occurs in the reception node 2.

Next, the monitoring apparatus 3 will be described. The monitoring apparatus 3 provides information for the administrator to perform appropriate determining failure and conduct effective failure measures. The monitoring apparatus 3 monitors, for example, a loss situation of the packets transmitted and received between the transmission node 1 and the reception node 2. The monitoring apparatus 3 determines whether the packet loss occurs in the network N or the packet loss occurs in the reception node 2 and outputs a determination result to an output apparatus 4. At the time of this determination result output, the monitoring apparatus 3 outputs, for example, graphic representations of the number of packet losses occurring in the network N and the number of packet losses occurring in the reception node 2 in a time series manner.

The monitoring apparatus 3 includes a central processing unit (CPU) 31, a memory 32, a storage apparatus 33, an output interface 34, a recording medium reading apparatus 35, and a communication interface 36. These hardware elements are connected so as to mutually communicable via a bus B. The CPU 31 is an arithmetic processing apparatus configured to control an entirety of the monitoring apparatus 3 (which will also be referred to as control unit or computer). The memory 32 temporarily stores data processed in various types of information processing executed by the CPU 31 and various programs. The memory 32 is, for example, a random access memory (RAM). The storage apparatus 33 stores programs and various pieces of data which will be described below. The storage apparatus 33 further stores a session information management table T1 and an analysis information table T2. The storage apparatus 33 is, for example, a magnetic storage apparatus such as a hard disk drive (HDD) or a non-volatile memory.

The output interface 34 is a device having a function of executing an interface function with the output apparatus 4 and is, for example, a graphic card. The output apparatus 4 is an apparatus configured to display and output, for example, the above-mentioned determination result and is, for example, a liquid crystal apparatus.

The recording medium reading apparatus 35 is an apparatus configured to read data recorded in a recording medium 35a. The recording medium 35a is a portable recording medium such as, for example, a compact disc read only memory (CD-ROM), a digital versatile disc (DVD), or a Universal Serial Bus (USB) memory. Programs which will be described with reference to FIG. 4 may also be recorded in the recording medium 35a.

The communication interface 36 is a communication device such as a network interface card (NIC) and is connected to a mirror port MP. The mirror port MP is, for example, a mirror port of a switch apparatus (not illustrated) provided in the network N. This switch apparatus duplicates (also referred to as mirroring) the packets flowing in the network N to be output from the mirror port MP to the communication interface 36 of the monitoring apparatus 3. Next, the session information management table T1 of FIG. 1 will be described.

FIG. 2 illustrates an example of the session information management table T1 of FIG. 1. In FIG. 2, for convenience of the illustration, the session information management table T1 is illustrated in the form of the session information management table T1a and the session information management table T1b. The session information management table T1a includes a session ID column, a transmission source IP address column, a transmission source port number column, a transmission destination IP address column, a transmission destination port number column, a maximum sequence number column, an ACK expected number column, a redundant ACK number column, and a maximum ACK number column.

The session ID column stores a session identifier (ID) for identifying a session. The session herein stands for a series of communications in a virtual communication path realized on the transport layer of the open systems interconnection (OSI) basic reference model from the use start of this communication path until the use end.

The transmission source IP address column stores a transmission source IP address of the data packet received by the monitoring apparatus 3, and the transmission source port number column stores a transmission source port number of the packet received by the monitoring apparatus 3. The transmission destination IP address column stores a transmission destination IP address of the packet received by the monitoring apparatus 3, and the transmission destination port number column stores a transmission destination port number of the packet received by the monitoring apparatus 3. The maximum sequence number column stores a maximum sequence number among sequence numbers of the packets received by the monitoring apparatus 3 in the session identified by the session ID. The ACK expected number column stores an ACK number expected to be possessed by the ACK packet received in the next time by the monitoring apparatus 3 in the session identified by the session ID. The redundant ACK number column stores, in a case where the ACK numbers of the ACK packets continuously received by the monitoring apparatus 3 are a same number in the session identified by the session ID, this same ACK number. The maximum ACK number column stores a maximum ACK number among the ACK numbers of the ACK packets received by the monitoring apparatus 3 in the session identified by the session ID.

The session information management table T1b includes the session ID column, a selective acknowledgement (SACK) block column, a reception node loss possibility range column, a reception node loss range column, a window size column, and a maximum length column. SACK stands for a selective acknowledgment, and a detail thereof will be described below.

The session ID column stores a session ID same as the session ID stored in the session ID column in the session information management table T1a. The SACK block column stores an SACK block of the ACK packet received by the monitoring apparatus 3 in the session identified by the session ID. The reception node loss possibility range column a range of sequence numbers of the data packets that may have been lost in the reception node 2. The reception node loss range column stores a sequence number of the data packet lost in the reception node 2.

The window size column stores a window size of the reception node 2. The window size indicates the amount of data (byte number) that can be continuously transmitted by the transmission node 1 without a transmission confirmation from the reception node 2. The window size indicates the receivable amount of the reception node 2. The maximum length column stores a maximum data length (byte number) of the packet. In FIG. 2, " . . . " stands for an omission of the description, "0" stands for an initial value, and "x" stands for that a cell indicated by this "x" does not store information. Other contents will be described below.

Figure 3:
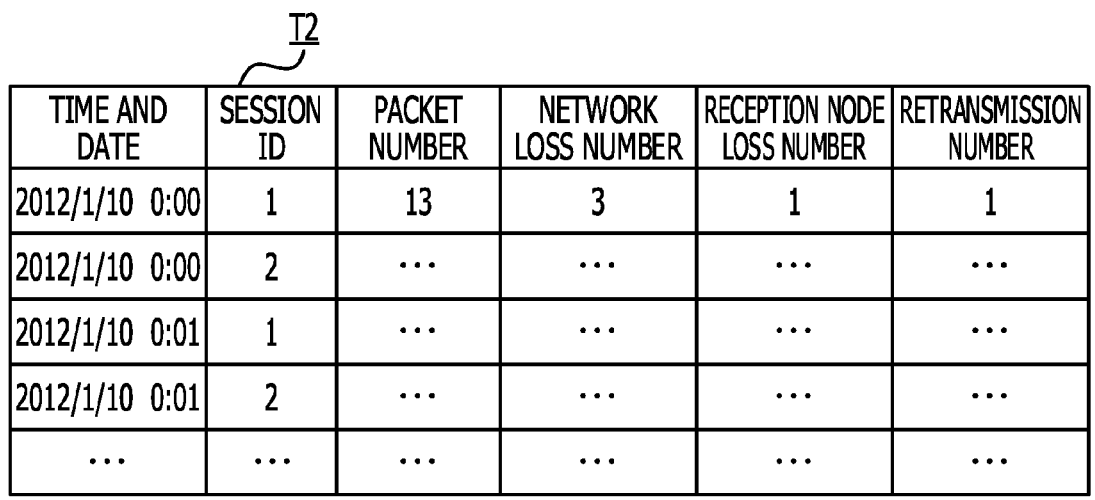
FIG. 3 illustrates an analysis information table example of FIG. 1.

FIG. 3 illustrates an example of the analysis information table T2 of FIG. 1. The analysis information table T2 includes a time and date column, a session ID column, a packet number column, a network loss number column, a reception node loss number column, and a retransmission number column.

The time and date column stores time and date at which output information is stored. This "time and date" stands for year, month, and day and time of the day in FIG. 3. The output information includes, for example, a packet number stored in the packet number column, a network loss number stored in the network loss number column, a reception node loss number stored in the reception node loss number column, and an exceptional retransmission packet number stored in the retransmission number column.

The session ID column stores a session ID corresponding to the session ID stored in the session ID column in the session information management table T1a. The packet number column stores the number of the data packets received by the monitoring apparatus 3 in the session identified by the session ID at the time and date stored in the time and date column. The network loss number column stores the number of the packets lost in the network N in the session identified by the session ID at the time and date stored in the time and date column. The reception node loss number column stores the number of packets lost in the reception node 2 in the session identified by the session ID at the time and date stored in the time and date column. The retransmission number column stores the number of packets exceptionally retransmitted by the transmission node 1 in the session identified by the session ID at the time and date stored in the time and date column. Specific contents stored in the respective columns will be described below.

Software Module Block Diagram

Figure 4:
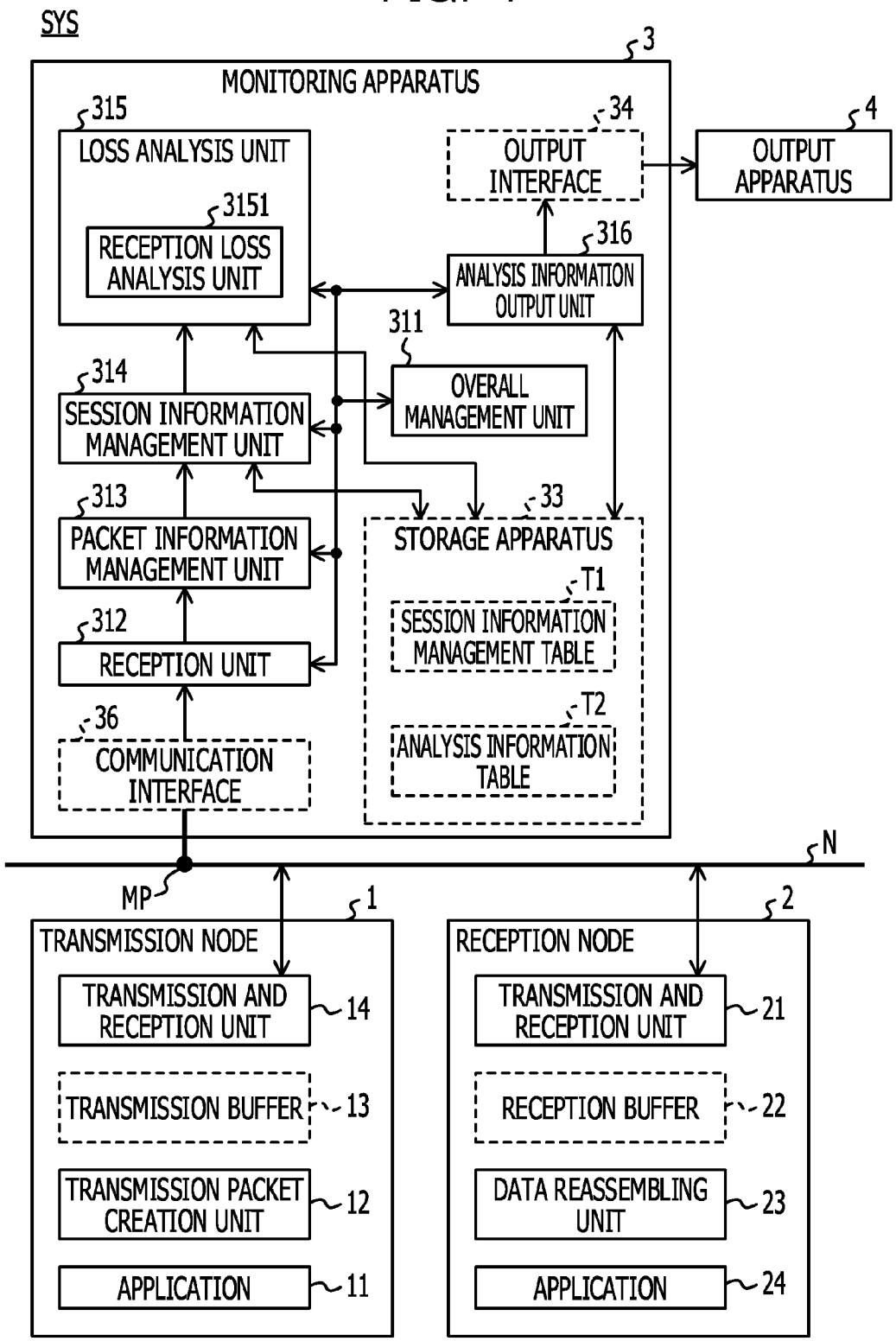
FIG. 4 is a software module block diagram example of a transmission node, a reception node, and a monitoring apparatus illustrated in FIG. 1.

FIG. 4 is a software module block example of the transmission node 1, the reception node 2, and the monitoring apparatus 3 illustrated in FIG. 1.

The transmission node 1 includes an application 11, a transmission packet creation unit 12, a transmission buffer 13, and a transmission and reception unit 14. The transmission buffer 13 corresponding to a hardware element in the transmission node 1 is illustrated by a dotted line. The application 11 is a program for executing various types of information processing and generates transmission data (also referred to as application data) to be output to the transmission packet creation unit 12.

The transmission packet creation unit 12 divides the transmission data input from the application 11 for each packet size on the basis of the TCP/IP protocol to create data packets and outputs the data packets to the transmission buffer 13. The transmission packet creation unit 12 generates a sequence number that uniquely identifies data from what byte of all transmission data is included in this data packet at the time of the data packet creation and stores the sequence number in the data packet.

The transmission buffer 13 is prepared by reserving a certain area of a memory (not illustrated) such as a RAM by a control program of the transmission node 1 as a buffering area for data packets. FIG. 4 schematically illustrates the transmission buffer 13 in this reserved state. The transmission buffer 13 temporarily stores the data packets input from the transmission packet creation unit 12. The transmission and reception unit 14 transmits the data packets stored in the transmission buffer 13 to the reception node 2. The transmission and reception unit 14 also receives the ACK packet transmitted from the reception node 2. The transmission and reception unit 14 then executes data packet retransmission processing on the basis of the received ACK packet.

The reception node 2 includes a transmission and reception unit 21, a reception buffer 22, a data reassembling unit 23, and an application 24. The reception buffer 22 corresponding to a hardware element in the reception node 2 is illustrated by a dotted line.

The transmission and reception unit 21 receives the data packet transmitted from the transmission node 1 and determines whether or not the data packet has normally been received. In a case where the data packet has normally been received, the transmission and reception unit 21 stores the received data packet in the reception buffer 22. The transmission and reception unit 21 generates an ACK packet on the basis of the TCP/IP protocol to be transmitted to the transmission node 1. The ACK packet includes information indicating that the data up to the "sequence number"-th part of the received data packet has been normally received. The ACK packet has a number of "sequence number+packet size", that is, an ACK number indicating a number for specifying the data requested to be transmitted. The ACK packet further has an SACK number corresponding to information indicating a selective acknowledgment. SACK will be described below.

The reception buffer 22 is prepared by reserving a certain area of a memory (not illustrated) such as a RAM by a control program of the reception node 2 as a buffering area for reception data packets. FIG. 4 schematically illustrates the reception buffer 22 in this reserved state. The size (byte number) of the reception buffer 22 corresponds to the window size. The reception buffer 22 temporarily stores the data packets input from the transmission and reception unit 21. The data reassembling unit 23 extracts data other than transmission and reception control data in the data packets stored in the reception buffer 22 on the basis of the TCP protocol. This extracted data is application data of a transmission target by the transmission node 1. The data reassembling unit 23 then executes the reassembling processing on the data of the transmission target on the basis of the sequence number of the data packet to be output to the application 24. The application 24 is a program for executing various types of information processing on the basis of the data input from the data reassembling unit 23.

The monitoring apparatus 3 includes an overall management unit 311, a reception unit 312, a packet information management unit 313, a session information management unit 314, a loss analysis unit 315, a reception loss analysis unit 3151, and an analysis information unit 316. The storage apparatus 33, the output interface 34, and the communication interface 36 corresponding to hardware elements in the monitoring apparatus 3 are illustrated by dotted lines.

The overall management unit 311 manages the reception unit 312, the packet information management unit 313, the session information management unit 314, the loss analysis unit 315, the reception loss analysis unit 3151, and the analysis information unit 316.

The reception unit 312 receives (also referred to as captures) the data packet and the ACK packet flowing through the network N via the communication interface 36. Specifically, the reception node 2 that has received the data packet transmitted from the transmission node 1 via the network N receives the ACK packet having the ACK number and the SACK number transmitted to the transmission node 1 via the network N. The information indicating the selective acknowledgment will be described below.

The packet information management unit 313 extracts header information of the packet received by the reception unit 312 to be output to the session information management unit 314. The session information management unit 314 performs a session management on the basis of the header information output by the overall management unit 311.

The session information management unit 314 stores various pieces of information related to a new session in the session information management table T1 of FIG. 2. Each time the reception unit 312 receives a packet, the session information management unit 314 further stores the maximum sequence number, the ACK expected number (the maximum sequence number+the packet length), the maximum ACK number, the redundant ACK number, the SACK block, the window size, and the maximum length corresponding to the session related to this received packet in the session information management table T1 of FIG. 2. The session information management unit 314 further outputs the header information input from the overall management unit 311 to the loss analysis unit 315.

The loss analysis unit 315 obtains the maximum sequence number, the ACK expected number, the maximum ACK number, the redundant ACK number, the SACK block, the window size, and the maximum length and detects a packet loss on the basis of the header information input from the session information management unit 314. The loss analysis unit 315 also appropriately updates the analysis information table T2 of FIG. 3 on the basis of the various pieces of information related to the detected packet loss.

The reception loss analysis unit 3151 manages a number of the reception node loss possibility range and a number of the reception node loss range and detects the packet loss occurring in the reception node 2. With this packet loss detection, the packet loss occurring in the reception node 2 is distinguished from the packet loss occurring in the network N. The reception loss analysis unit 3151 also appropriately updates the analysis information table T2 of FIG. 3 on the basis of the various pieces of information related to the detected packet loss. Details of the loss analysis unit 315 and the reception loss analysis unit 3151 will be described below.

The analysis information unit 316 refers to the analysis information table T2 of FIG. 3 and calculates a packet loss rate for a certain period of time for each session or the like. This packet loss rate stands for a value obtained by dividing the number of packet losses counted for a certain period of time by the number of all packets received for this certain period of time. The analysis information unit 316 also performs processing such as a creation of time-series data for each session for an analysis result output.

The overall management unit 311, the reception unit 312, the packet information management unit 313, the session information management unit 314, the loss analysis unit 315, the reception loss analysis unit 3151, and the analysis information unit 316 are realized by a program. This program is stored, for example, in the storage apparatus 33. The CPU 31 of FIG. 1 reads out these programs from the storage apparatus 33 at the time of the activation to be loaded into the memory 32, so that these programs function as a software module.

This program may also be recorded in the recording medium 35a that is read by the recording medium reading apparatus 35 described with reference to FIG. 1. In this case, the CPU 31 of FIG. 1 reads out these programs from the recording medium 35a mounted to the recording medium reading apparatus 35 at the time of the activation to be loaded into the memory 32, so that these programs function as the software module.

Packet Communication Outline

Before an operation of the monitoring apparatus according to the present embodiment will be described, a description will be given of a packet communication outline. The transmission node 1 transmits the data packet to the reception node 2, and the reception node 2 transmits the ACK packet having the ACK number to the transmission node 1 as described with reference to FIG. 1. The transmission node 1 transmits the data packet having the sequence number corresponding to this ACK number (next data packet) to the transmission node 1. The transmission node 1 and the reception node 2 execute the packet communication through the series of data packet transmission and reception and ACK packet ACK transmission and reception. However, since the transmission node 1 waits for the reception of the ACK packet and transmits the next data packet in the packet communication described above, this configuration is redundant.

In view of the above, the transmission node 1 may continuously transmit plural data packets at once without waiting for the reception of the ACK packet in some cases. The transmission node 1 sets the total byte number of the plural continuous data packets to be within the window size of the reception node 2 at this time (for example, see request for comments (RFC):793). However, as will be described below, the received packet may be discarded in some cases in the reception node 2, for example, because of the capacity shortage of the reception buffer.

If a packet loss occurs in the network, for example, and a certain data packet does not reach the reception node 2, a data packet subsequent to this data packet arrives. In this case, each time the subsequent data packet arrives, the reception node 2 transmits the ACK packet having the sequence number of the lost data packet as the ACK number to the transmission node 1.

When, for example, three ACK packets having a same ACK number (also referred to as redundant ACK number) are received, the transmission node 1 determines that the data packet has been lost and executes data packet retransmission processing from the data packet having the sequence number corresponding to the redundant ACK number. Even when the redundant ACK number is not received, in a case where the transmission node 1 does not receive the ACK packet from the reception node 2 within a retransmission timeout period from the data packet transmission time, the data packet retransmission processing may be conducted in some cases. The transmission node 1 performs a packet loss recovery through this retransmission processing.

It is assumed that when the transmission node 1 continuously transmits data packets by the amount corresponding to the window size of the reception node 2, an early part of data packets has been lost among the continuously transmitted data packets. In this case, the transmission node 1 retransmits all the data packets after a lost data packet in a response acknowledgement of the reception node 2 (also referred to as receipt acknowledgement) based on the ACK packet only having the ACK number. Since the packet communication efficiency is not satisfactory in this retransmission, if the transmission node 1 can negotiate with the reception node 2, SACK may be used as an option of ACK.

In a case where the transmission node 1 transmits the continuous data packets, a certain data packet in this continuous data packets has been lost, but the reception node 2 may receive the data packets subsequent to the lost data packet in some cases. At this time, the reception node 2 describes a range of the sequence numbers in the received data packets in the SACK block and includes this in the ACK packet as the option of ACK to be replied. This range of the sequence numbers is equivalent to SACK. In other words, the reception node 2 specifies a starting number and an ending number of sequence numbers in a continuous range of the normally received data packets as SACK (also referred to as SACK block). Herein, "normally received" also includes a case where the reception node 2 does not discard received data packets for any reason. This reason will be described below with reference to FIG. 10. That is, in the specification of SACK, "normally received" is not applied to a case where the reception node 2 discards the received data packets for any reason.

The SACK block is represented, for example, by "an initial sequence number to a last sequence number+1 of the normally received continuous data packets" and can be set in units of plural blocks. In a case where 1 byte is equivalent to 1 in the sequence number, the last sequence number+1 is equivalent to a number obtained by adding a total number of bytes of the continuous data packets to the initial sequence number. According to the present embodiment, the initial sequence number is also referred to as "Left" of the sequence number, and the last sequence number+1 is also referred to as "Right" of the sequence number. This number of the SACK block (also referred to as SACK number) is an example of the information indicating the selective acknowledgment.

The following processing is executed in a case where the transmission node 1 has received the ACK packet having the SACK block. That is, the transmission node 1 transmits the data packet that has not been received by the reception node 2 on the basis of the ACK number of the ACK packet and the SACK block. For example, the transmission node 1 first retransmits data packets corresponding to a range from the ACK number to the sequence number immediately before the sequence number of the first SACK block. Next, the transmission node 1 sequentially performs processing of retransmitting data packets corresponding to a range from the last sequence number of the SACK block to the sequence number immediately before the next SACK block. A wasteful retransmission is avoided through this retransmission processing.

An outline of the packet communication will specifically be described with reference to FIG. 4 on the basis of FIG. 5 and FIG. 6.

Figure 5:
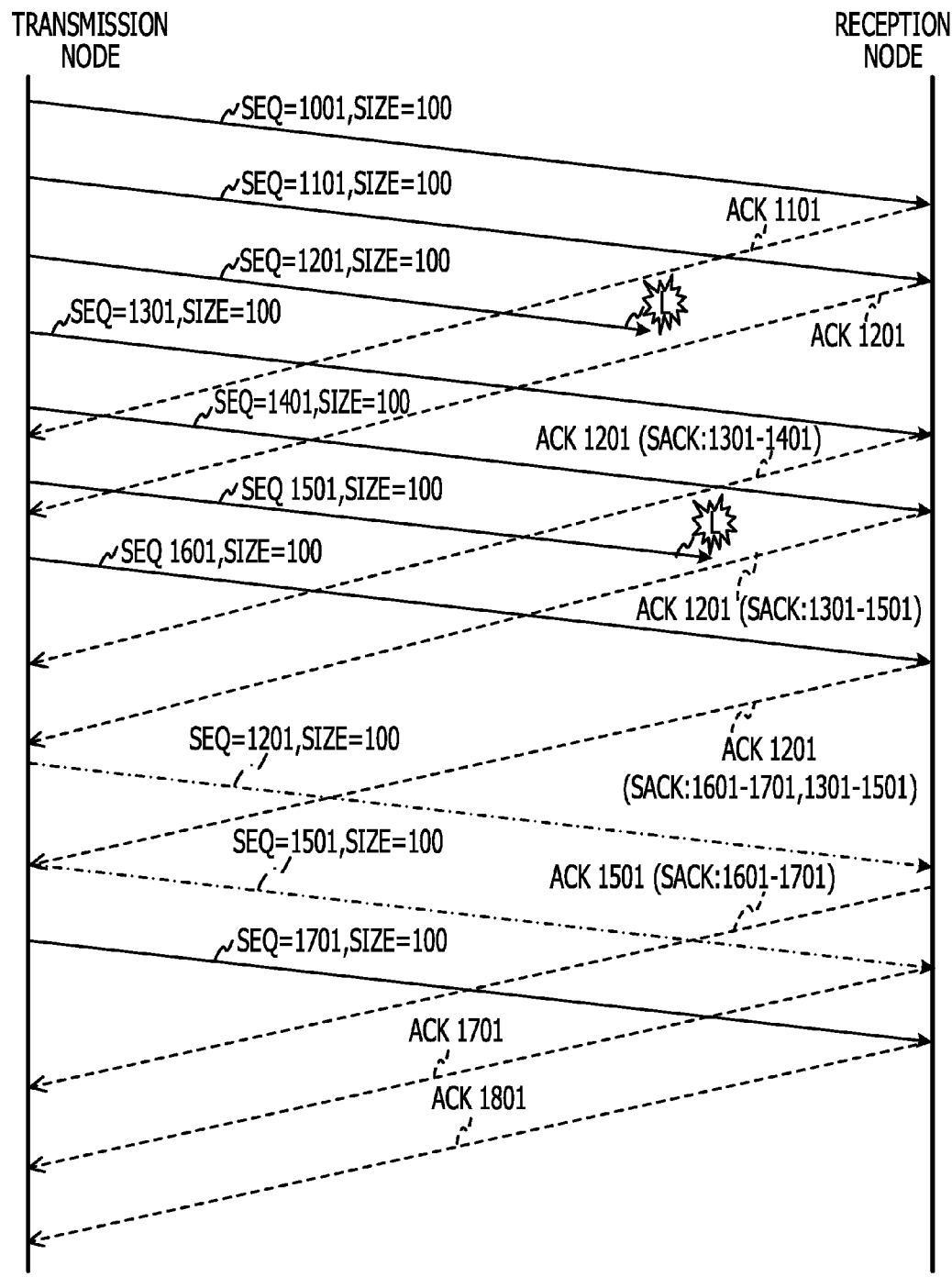
FIG. 5 is a sequence diagram schematically illustrating a state in which packets are transmitted and received between the transmission node and the reception node.

FIG. 5 is a sequence diagram schematically illustrating a state in which packets are transmitted and received between the transmission node 1 and the reception node 2.

In FIG. 5, a solid line arrow in a direction from the transmission node 1 towards the reception node 2 indicates that the transmission node 1 transmits a data packet to the reception node 2. A dotted line arrow in a direction from the reception node 2 towards the transmission node 1 indicates that the reception node 2 transmits an ACK packet to the transmission node 1. A dashed-dotted line arrow in a direction from the transmission node 1 towards the reception node 2 indicates that the transmission node 1 transmits a retransmission data packet to the reception node 2.

FIG. 6 is an explanatory diagram for describing the sequence number, ACK, and SACK. A table T3 of FIG. 6 includes a sequence number column, an ACK column, an SACK 1st block column, and an SACK 2nd block column. The SACK 1st block column and the SACK 2nd block column both include a Left column and a Right column.

As illustrated in FIG. 5, the sequence number of the data packet transmitted by the transmission node 1 is described in the sequence number column. As illustrated in FIG. 5, the ACK number of the ACK packet transmitted by the reception node 2 is described in the ACK column. The ACK number is described in a row after a row where the sequence number is described. Left and Right of the first SACK block are described in the Left column and the Right column of the SACK 1st block column in a case where the ACK packet having the ACK number described in the ACK column further has the first SACK block. Left and Right of the second SACK block are described in the Left column and the Right column of the SACK 2nd block column in a case where the ACK packet having the ACK number described in the ACK column further has the second SACK block.

In the description of FIG. 5 and FIG. 6, the transmission and reception unit 14 of the transmission node 1 transmits the plural continuous data packets at once without waiting for the reception of the ACK packet. A size of one data packet is set as a predetermined size, for example, 100 bytes (in FIG. 5, SIZE=100). As illustrated in FIG. 5, herein, the transmission and reception unit 14 of the transmission node 1 transmits a data packet having a sequence number "1001" (see reference sign SEQ=1001, SIZE=100) to the reception node 2. When this data packet has been received, the transmission and reception unit 21 of the reception node 2 transmits an ACK packet having an ACK number "1101" (see reference sign ACK1101) indicating the sequence number of the next data packet to the transmission node 1.

The transmission and reception unit 14 of the transmission node 1 transmits a data packet having a sequence number "1101" (see reference sign SEQ=1101, SIZE=100) to the reception node 2. When this data packet has been received, the transmission and reception unit 21 of the reception node 2 transmits an ACK packet having an ACK number "1201" (see reference sign ACK1201) to the transmission node 1.

While the transmission and reception unit 14 of the transmission node 1 transmits a data packet having a sequence number "1201" (see reference sign SEQ=1201, SIZE=100) to the reception node 2, the reception node 2 has not received this data packet for any reason (see reference sign L). A reason why this data packet has not been received is, for example, that this data packet has been lost in the network. This loss is described as "1201 (loss)" in the sequence number column in FIG. 6.

Subsequently, the transmission and reception unit 14 of the transmission node 1 transmits a data packet having a sequence number "1301" (see reference sign SEQ=1301, SIZE=100) to the reception node 2. When this data packet has been received, the transmission and reception unit 21 of the reception node 2 transmits an ACK packet having the ACK number "1201" for specifying the transmission request data packet and an SACK block to the transmission node 1. In a case where the data packet having the sequence number 1201" has been lost, the transmission and reception unit 21 of the reception node 2 transmits an ACK packet having the ACK number "1201" and an SACK block "1301-1401" (1301 corresponds to Left and 1401 corresponds to Right) to the transmission node 1 (see reference sign ACK1201 (SACK:1301-1401)).

The transmission and reception unit 14 of the transmission node 1 transmits a data packet having a sequence number "1401" (see reference sign SEQ=1401, SIZE=100) to the reception node 2. When this data packet has been received, the transmission and reception unit 21 of the reception node 2 transmits an ACK packet having the ACK number "1201" and an SACK block "1301-1501" (see reference sign ACK1201 (SACK:1301-1501)) to the transmission node 1.

The transmission and reception unit 14 of the transmission node 1 transmits a data packet having a sequence number "1501" (see reference sign SEQ=1501, SIZE=100) to the reception node 2. The reception node 2 has not received this data packet for any reason (see reference sign L). This loss is described as "1501 (loss)" in the sequence number column in FIG. 6.

Subsequently, the transmission and reception unit 14 of the transmission node 1 transmits a data packet having a sequence number "1601" (see reference sign SEQ=1601, SIZE=100) to the reception node 2. When this data packet has been received, the transmission and reception unit 21 of the reception node 2 transmits an ACK packet having the ACK number "1201" for specifying the transmission request data packet and an SACK block (see reference sign ACK1201 (SACK:1601-1701, SACK1301-1501)) to the transmission node 1. This SACK block has Left of the first SACK block as "1601", Right of the first SACK block as "1701", Left of the second SACK block as "1301", and Right of the second SACK block as "1501".

For example, when the redundant ACK number has been received by three times, the transmission and reception unit 14 of the transmission node 1 transmits data packets by the amount of a predetermined size having a sequence number corresponding to a redundant ACK number. In the case of the above-mentioned example, the redundant ACK number is "1201", and the predetermined size is 100 bytes. Therefore, the transmission and reception unit 14 of the transmission node 1 retransmits the 100-byte data packet having the sequence number "1201" (see reference sign SEQ=1201, SIZE=100) to the reception node 2. This retransmission is described as "1201 (retransmission)" in the sequence number column in FIG. 6.

When the 100-byte data packet having the sequence number "1201" has been received, the transmission and reception unit 21 of the reception node 2 transmits an ACK packet having the ACK number "1501" for specifying the transmission request data packet and an SACK block (see reference sign ACK1501 (SACK:1601-1701)) to the transmission node 1. This SACK block has Left as "1601" of the SACK block and Right as "1701" of the SACK block.

The transmission and reception unit 14 of the transmission node 1 has received this ACK packet (see reference sign ACK1501 (SACK:1601-1701)). The transmission and reception unit 14 of the transmission node 1 then transmits the data packet that has not been received by the reception node 2 on the basis of the ACK number of the ACK packet and the SACK block. In this case, from the above-mentioned SACK block, the data packet that has not been received by the reception node 2 is the 100-byte data packet having the sequence number "1501". Therefore, the transmission and reception unit 14 of the transmission node 1 retransmits the 100-byte data packet having the sequence number "1501" (see reference sign SEQ=1501, SIZE=100) to the reception node 2. This retransmission is described as "1501 (retransmission)" in the sequence number column in FIG. 6.

The transmission and reception unit 14 of the transmission node 1 further transmits a 100-byte data packet having the sequence number "1701" (see reference sign SEQ=1701, SIZE=100) to the reception node 2.

When the 100-byte data packet having the sequence number "1501" has been received, the transmission and reception unit 21 of the reception node 2 transmits an ACK packet having an ACK number "1701" (see reference sign ACK1701) to the transmission node 1. When the 100-byte data packet having the sequence number "1701" has been received, the transmission and reception unit 21 of the reception node 2 further transmits an ACK packet having an ACK number "1801" (see reference sign ACK1801) to the transmission node 1.

The transmission node 1 transmits the transmission target data, that is, application data, to the reception node 2 through the series of data packet transmission and reception and ACK packet transmission and reception carried out between the transmission node 1 and the reception node 2 described in FIG. 5.

Determination Processing

As described above, the transmission node 1 transmits the plural continuous data packets at once without waiting for the reception of the ACK packet in some cases. At this time, the transmission node 1 sets the total data amount of the plural continuous data packets within the window size of the reception node 2.

However, the transmission node 1 may set the total data amount of the plural continuous data packets to be higher than the window size of the reception node 2 in some cases. A reason for this higher setting is an error in terms of design in a TCP/IP communication program or that more data packets are to be transmitted at once. In this case, the reception node 2 discards a received data packet because of the capacity shortage of the reception buffer 22 (packet loss in the reception node 2). The reception node 2 than transmits an ACK packet having an ACK number for specifying the discarded data packet and an SACK block to the transmission node 1 and performs a retransmission request of the discarded data packet to the transmission node 1. In response to this request, the transmission node 1 retransmits this data packet to the reception node 2. At this time, the monitoring apparatus 3 according to the present embodiment receives the retransmitted data packet and executes processing of determining whether the data packet is lost in the network or lost in the reception node 2.

A packet loss cause determination processing will be described with reference to FIG. 2 and FIG. 3 on the basis of FIG. 7, FIG. 8, and FIG. 9.

Figure 7:
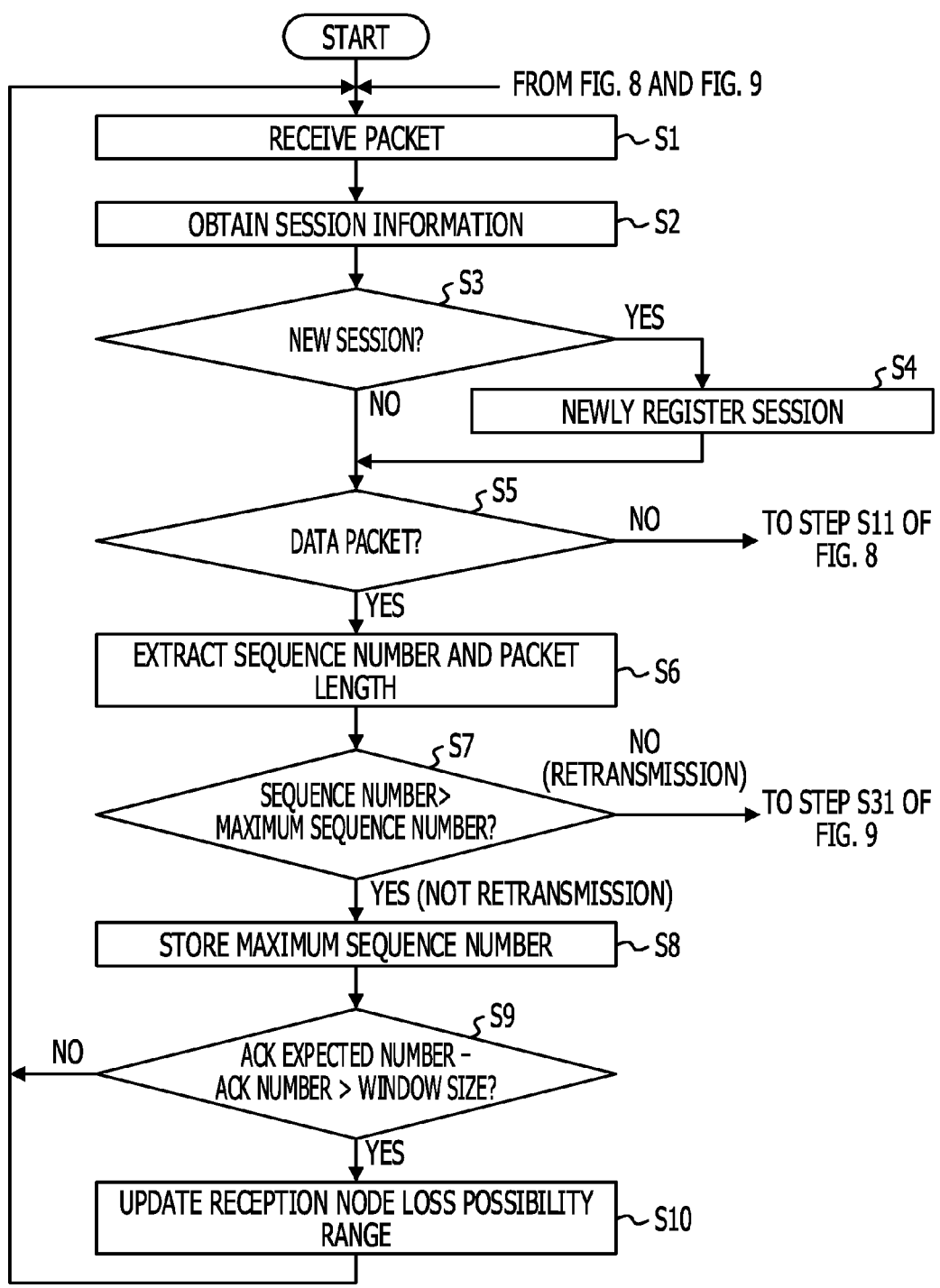
FIG. 7 is a first flow chart for describing a packet loss cause determination processing.
Figure 8:
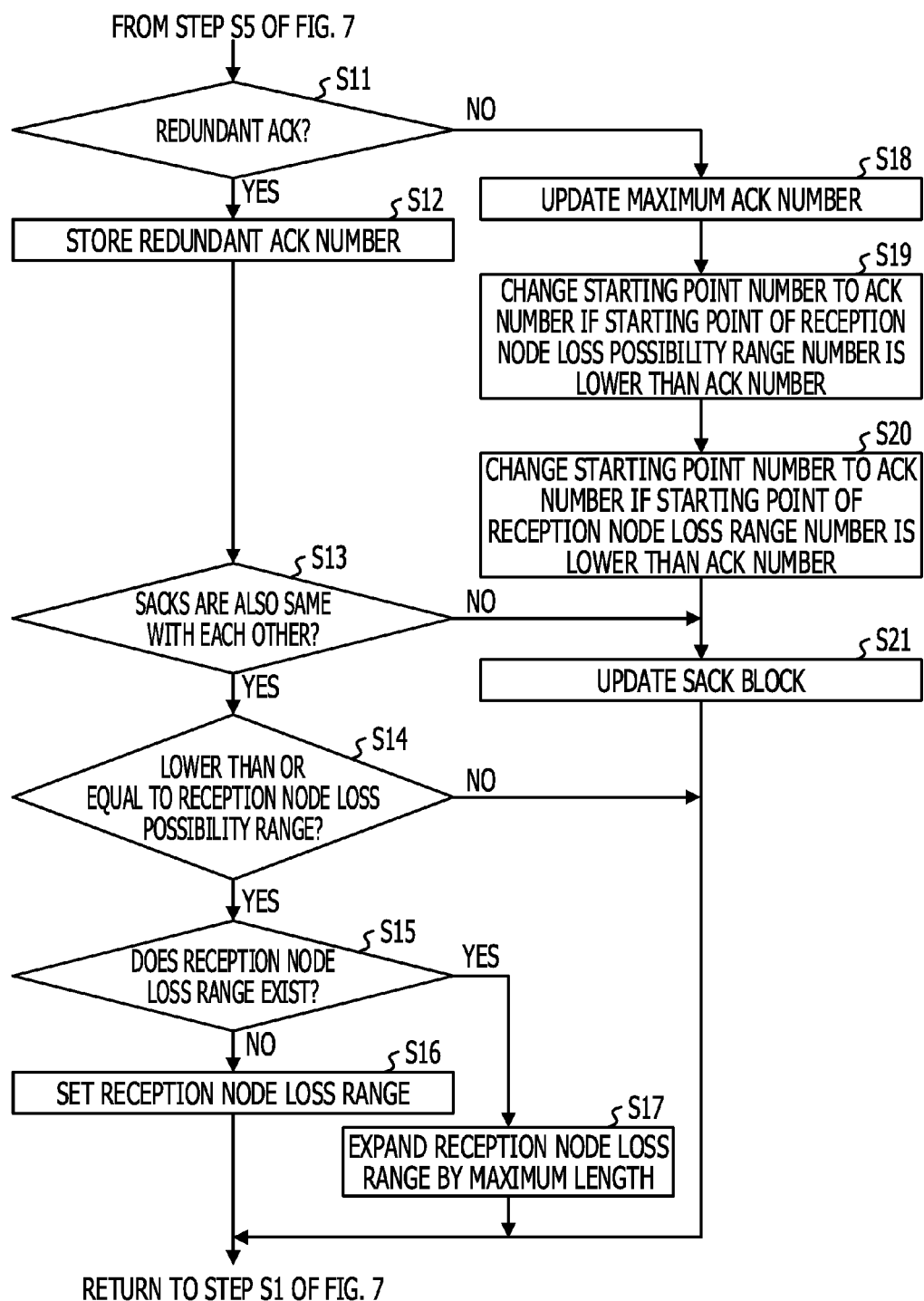
FIG. 8 is a second flow chart for describing the packet loss cause determination processing.
Figure 9:
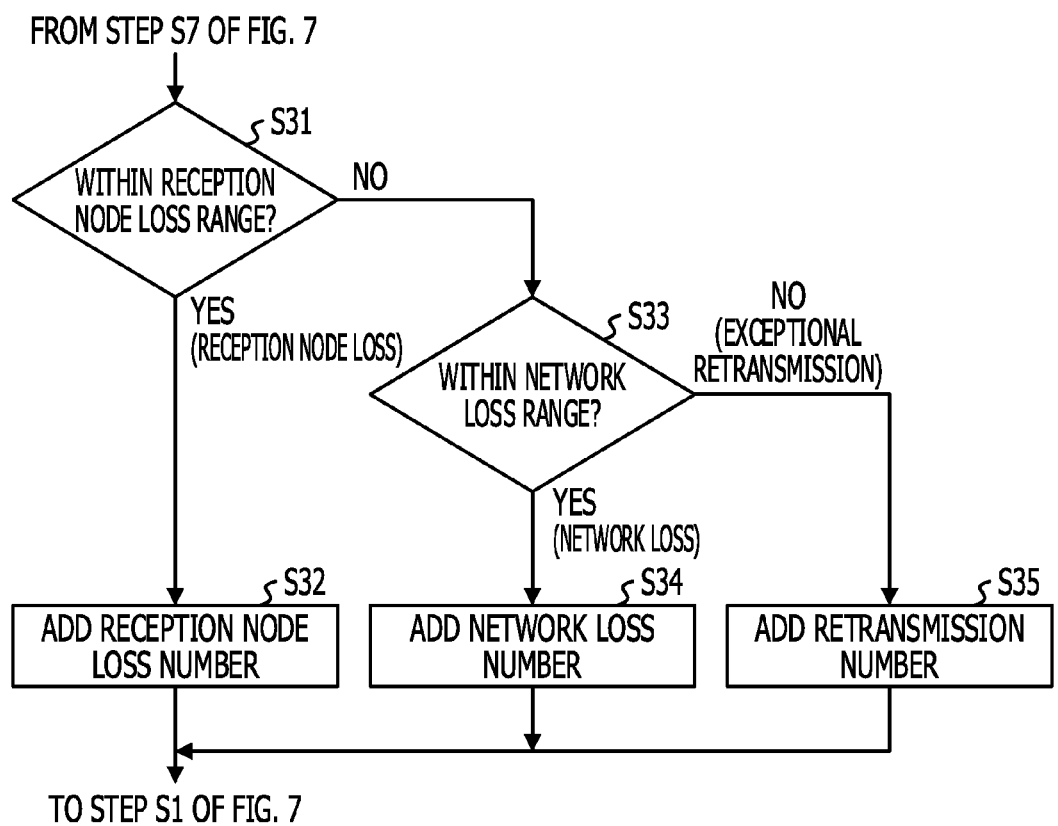
FIG. 9 is a third flow chart for describing the packet loss cause determination processing.

FIG. 7, FIG. 8, and FIG. 9 are examples of first, second, and third flow charts for describing the packet loss cause determination processing. The flow chart of FIG. 8 is for describing subsequent processing in the case of NO determination in step S5 of FIG. 7. The flow chart of FIG. 9 is for describing subsequent processing in the case of NO determination in step S7 of FIG. 7. First, the flow chart of FIG. 7 will be described.

Step S1: the reception unit 312 of FIG. 4 receives a packet via the communication interface 36 and outputs the packet to the packet information management unit 313. The packet information management unit 313 extracts header information of the packet input from the reception unit 312 and outputs the header information to the session information management unit 314.

Step S2: the session information management unit 314 obtains session information from the header information. This session information has information for determining whether or not the received packet is a session establishment packet. The session establishment packet includes a TCP synchronous request packet transmitted from the reception node 2 to the transmission node 1, this TCP synchronous request packet and a response packet replied from the transmission node 1 to the reception node 2, and a response packet replied from the reception node 2 to the transmission node 1. These three types of packets are appropriately referred to as handshake packets. The transmission node 1 and the reception node 2 establish a session with this handshake packet. Transmission and reception of this handshake packet is also referred to as three-way handshake. The transmission node 1 and the reception node 2 obtain a first sequence number from the handshake packet in this three-way handshake to be set in a memory (not illustrated) of its own apparatus. The session information management unit 314 outputs the header information to the loss analysis unit 315.

Step S3: the session information management unit 314 determines whether or not a new session is started on the basis of the obtained session information. Specifically, in a case where the handshake packet described in step S2 has been received, the session information management unit 314 determines that the new session is started. When the new session is started (step S3/YES), the processing shifts to step S4.

Step S4: the session information management unit 314 newly registers the new session in the session information management table T1a of FIG. 2. Specifically, the session information management unit 314 newly generates a session ID and stores the generated session ID in the session ID column in the session information management table T1a of FIG. 2. At this time, the session information management unit 314 assigns branch numbers for dividing this session into two to the session ID. For example, in a case where a session ID "1" is generated, the session information management unit 314 assigns a first branch number "-1" and a second branch number "-2" to the session ID "1" to divide the session ID "1". That is, the session information management unit 314 generates a first session ID "1-1" and a second session ID "1-2" corresponding to the two session IDs for identifying the one session. The first session ID is used for managing information related to data packets transmitted from the transmission node 1 to the reception node 2 in the identification target session, and the second session ID is used for managing information related to ACK packets transmitted from the reception node 2 to the transmission node 1 in the identification target session.

The session information management unit 314 further obtains a transmission source IP address, a transmission source port number, a transmission destination IP address, and a transmission destination port number from IP header information of the received packet to be stored in the transmission source IP address column, the transmission source port number column, the transmission destination IP address column, and the transmission destination port number column in the session information management table T1a of FIG. 2.

For example, it is assumed that a header of a first packet transmitted from the transmission node 1 to the reception node 2 stores a transmission source IP address "a1.b1.c1.d1", a transmission source port number "p1", a transmission destination IP address "a2.b2.c2.d2", and a transmission destination port number "p2", and a header of a second packet transmitted from the reception node 2 to the transmission node 1 stores a transmission source IP address "a2.b2.c2.d2", a transmission source port number "p2", a transmission destination IP address "a1.b1.c1.d1", and a transmission destination port number "p1".

In this case, the session information management unit 314 stores "a1.b1.c1.d1", "p1", "a2.b2.c2.d2", and "p2" in the transmission source IP address column, the transmission source port number column, the transmission destination IP address column, and the transmission destination port number column in the session information management table T1*a* of FIG. 2 corresponding to the first session ID "1-1". The session information management unit 314 then stores "a2.b2.c2.d2", "p2", "a1.b1.c1.d1", and "p1" in the transmission source IP address column, the transmission source port number column, the transmission destination IP address column, and the transmission destination port number column in the session information management table T1*a* of FIG. 2 corresponding to the second session ID "1-2".

The session information management unit 314 further obtains a window size from the obtained session information and stores the obtained window size in the window size column corresponding to the session ID "1-1" in the session information management table T1*b* of FIG. 2. That is, the reception unit 312 receives the packet having the window size of the reception node 2 which has been transmitted from the reception node 2 to the transmission node 1. The session information management unit 314 then stores the window size.

After finishing step S4, the processing shifts to step S5. In a case where it is determined in step S3 that the new session is not started (step S3/NO), the processing shifts to step S5.

Step S5: the session information management unit 314 determines whether or not the received packet is a data packet or an ACK packet on the basis of the header information input from the packet information management unit 313. In a case where it is determined that the packet is the ACK packet (step S5/NO), the processing shifts to step S11 of FIG. 8. In a case where it is determined that the packet is the data packet (step S5/YES), the processing shifts to step S6. In a case where the ACK packet has window size update information, the updated window size is stored in the window size column corresponding to the session ID "1-1" in the session information management table T1*b* of FIG. 2.

Step S6: the session information management unit 314 extracts a sequence number and a data length (also referred to as packet size) from the header information input from the packet information management unit 313. The data length is represented, for example, in units of byte, and this one byte corresponds to "1" in the sequence number. This data length is also the maximum data length of the data packet. The session information management unit 314 stores the data length in the maximum length column corresponding to the session ID "1-1" in the session information management table T1*b* of FIG. 2. The maximum length is set as 100 bytes herein. The session information management unit 314 counts up a received data packet number counter configured to count the number of received data packets by one. The session information management unit 314 stores the received data packet number counter in the memory 32 of FIG. 1 while being associated with the session ID.

Step S7: the session information management unit 314 determines whether or not the sequence number extracted in step S6 is higher than or equal to the maximum sequence number. This maximum sequence number stands for a maximum sequence number among the sequence numbers of the data packets received by the overall management unit 311 in the management target session. In a case where no packet loss occurs, the sequence number of the data packet is mainly increased in proportion to the number of received data packets. However, if a packet loss occurs, the transmission node 1 transmits a data packet having a sequence number lower than or equal to this maximum sequence number. For that reason, it is possible to determine whether or not the received data packet is a retransmitted packet by comparing the maximum sequence number with the sequence number of the reception data packet.

In a case where the sequence number extracted in step S6 is lower than or equal to the maximum sequence number (step S7/NO (retransmission)), the processing shifts to step S31 of FIG. 9. Step 31 of FIG. 9 will be described below. In a case where the sequence number extracted in step S6 is higher than the maximum sequence number (step S7/YES (not retransmission)), the processing shifts to step S8.

Step S8: the session information management unit 314 stores the sequence number extracted in step S6 in the maximum sequence number column in the session information management table T1*a* of FIG. 2 as the maximum sequence number. The session information management unit 314 further stores the ACK expected number in the ACK expected number column in the session information management table T1*a* of FIG. 2. The ACK expected number is a number obtained by adding the sequence number of the received data packet to the data length. In other words, in a case where the reception node 2 that has received the data packet replies the ACK packet to the transmission node 1, the ACK expected number stands for an ACK number stored in this ACK packet. Herein, since the data length is represented, for example, in units of byte, one byte corresponds to "1" in the sequence number.

Step S9: the session information management unit 314 determines whether or not a subtraction number obtained by subtracting the ACK number of the ACK packet received immediately before from the ACK expected number (which will be appropriately be referred to as ACK subtraction number) is higher than the window size. In step S9, the session information management unit 314 determines whether or not the total data amount (total byte number) of the continuously received data packets exceeds the window size of the reception node 2 (receivable amount) on the basis of the sequence number of the received data packet and the ACK number of the ACK packet. A probability that a packet loss occurs in the reception node 2 is increased in a case where the total data amount exceeds the window size. When the subtraction number is lower than or equal to the window size (step S9/NO), the processing returns to step S1. When the subtraction number is larger than the window size (step S9/YES), the processing shifts to step S10.

Step S10: the loss analysis unit 315 updates the reception node loss possibility range column in the session information management table T1*b* of FIG. 2 on the basis of the header information input from the session information management unit 314.

In a case where step S10 is executed for the first time, the loss analysis unit 315 stores the sequence number of the received data packet and an addition number obtained by adding the data length to this sequence number in the reception node loss possibility range column in the session information management table T1*b* of FIG. 2. This sequence number is appropriately referred to as a starting point number of the reception node loss possibility range. This addition number is appropriately referred to as an ending point number of the reception node loss possibility range. On the other hand, in a case where step S10 is executed on an occasion after the first time, the loss analysis unit 315 adds the data length to the ending point number of the reception node loss possibility range stored in the reception node loss possibility range column. After that, the number after this addition corresponds to the above-mentioned ending point number. After the execution of step S10, the processing returns to step S1.

In step S5 in FIG. 7, the session information management unit 314 determines that the received packet is the ACK packet on the basis of the header information input from the packet information management unit 313 (step S5/NO), the processing shifts to step S11 of FIG. 8.

Step S11: the session information management unit 314 determines whether or not the received ACK packet is the packet having the redundant ACK number. Specifically, the session information management unit 314 determines whether or not the ACK number of the received ACK packet is matched with the ACK number of the ACK packet received immediately before. The session information management unit 314 determines that the received ACK packet is the packet having the redundant ACK number in a case where both the ACK numbers are matched with each other.

In a case where the received ACK packet is not the packet having the redundant ACK number (step S11/NO), the processing shifts to step S18. In a case where the received ACK packet is the packet having the redundant ACK number (step S11/YES), the processing shifts to step S12.

Step S12: the session information management unit 314 stores the redundant ACK number in the redundant ACK number column in the session information management table T1a of FIG. 2.

Step S13: the session information management unit 314 determines whether or not SACKs are also the same with each other. Specifically, the session information management unit 314 determines whether or not the number of the SACK block of the received ACK packet and the number of the SACK block of the ACK packet received immediately before are a same number. In the case of the same number, the session information management unit 314 determines that SACKs are the same with each other. When SACKs are not the same with each other (step S13/NO), the processing shifts to step S21. When SACKs are also the same with each other (step S13/YES), the processing shifts to step S14.

The loss analysis unit 315 herein may execute the following processing by comparing a first ACK number and a first SACK number of the first ACK packet with a second ACK number and a second SACK number of the second ACK packet received after the first ACK packet. For example, in a case where the first ACK number and the first SACK number are the same as the second ACK number and the second SACK number (step S11/YES, step S13/YES), the reception loss analysis unit 3151 determines that the data packet loss occurs in the reception node 2. In a case where the first ACK number and the second ACK number are the same with each other and the first SACK number and the second SACK number are different from each other, the loss analysis unit 315 determines that the data packet loss occurs in the network N. The analysis information unit 316 then outputs the number of determinations that the data packet loss occurs in the reception node 2 and the number of determinations that the data packet loss occurs in the network N to the output apparatus 4. The efficiency of the processing is increased through these determinations.

Step S14: the loss analysis unit 315 determines whether or not the number of the SACK block of the received ACK packet is lower than or equal to the reception node loss possibility range. Specifically, the loss analysis unit 315 determines whether or not the number of the SACK block is lower than or equal to the starting point number of the reception node loss possibility range stored in the reception node loss possibility range column in the session information management table T1b of FIG. 2. The loss analysis unit 315 determines that the number of the SACK block is lower than or equal to the reception node loss possibility range in a case where the number of the SACK block is lower than or equal to the starting point number. In a case where the number of the SACK block is not lower than or equal to the reception node loss possibility range (step S14/NO), the processing returns to step S1 of FIG. 7. In a case where the above-mentioned number of the SACK block is lower than or equal to the reception node loss possibility range (step S14/YES), the processing shifts to step S15.

Step S15: the loss analysis unit 315 determines whether or not the reception node loss range exists. Specifically, the loss analysis unit 315 determines whether or not step S16 has already been executed at least once. The loss analysis unit 315 determines that the reception node loss range exists in a case where step S16 has been executed. When the reception node loss range exists (step S15/YES), the processing shifts to step S17. In a case where step S16 has not yet been executed, that is, a case where the reception node loss range does not exist (step S15/NO), the processing shifts to step S16.

Step S16: the loss analysis unit 315 stores the reception node loss range. Specifically, the loss analysis unit 315 stores a value obtained by adding the window size to the ACK number of the received ACK packet and a value obtained by adding the window size and the data length to this ACK number in the reception node loss range column in the session information management table T1b of FIG. 2. In other words, the loss analysis unit 315 stores the data stored in the reception node loss possibility range column in the session information management table T1b of FIG. 2 in the reception node loss range column. Hereinafter, the value obtained by adding the window size to the ACK number of the received ACK packet is appropriately referred to as starting point number of the reception node loss range. The value obtained by adding the window size and the data length to this ACK number is appropriately referred to as ending point number of the reception node loss range.

In the loss analysis unit 315, in a case where the total data amount described in step S9 exceeds the window size of the reception node 2 (step S9/YES), the processing executes step S16. In step S15 and step S16, the loss analysis unit 315 executes the following processing in a case where the first ACK number and the first SACK number of the first ACK packet and the second ACK number and the second SACK number of the second ACK packet received after the first ACK packet are the same with each other. That is, the loss analysis unit 315 stores the first sequence number of the first data packet that has been received beyond the window size and the second sequence number of the second data packet received after the first data packet.

Step S17: the loss analysis unit 315 expands the reception node loss range by the maximum length (data length). Specifically, the loss analysis unit 315 adds the data length to the ending point number of the reception node loss range stored in the reception node loss range column in the session information management table T1b of FIG. 2.

When the processing in step S16 or step S17 is ended, the processing returns to step S1 of FIG. 7.

In step S11 of FIG. 8, when this is not the redundant ACK number (step S11/NO), the processing shifts to step S18.

Step S18: the session information management unit 314 updates the maximum ACK number. Specifically, the session information management unit 314 stores the ACK number of the received ACK packet in the maximum ACK number column in the session information management table T1a of FIG. 2.

Step S19: if the starting point number of the reception node loss possibility range stored in the reception node loss possibility range column in the session information management table T1b of FIG. 2 is lower than the ACK number of the received ACK packet, the loss analysis unit 315 changes this starting point number to the ACK number.

Step S20: if the starting point number of the reception node loss range stored in the reception node loss range column in the session information management table T1b of FIG. 2 is lower than the ACK number of the received ACK packet, the loss analysis unit 315 changes this starting point number to the ACK number.

Step S21: the session information management unit 314 updates the SACK block. Specifically, the session information management unit 314 stores the number of the SACK block of the received ACK packet in the SACK block column in the session information management table T1b of FIG. 2. When the processing in step S21 is ended, the processing returns to step S1 of FIG. 7.

In step S7 of FIG. 7, in a case where the session information management unit 314 determines that the sequence number extracted in step S6 (sequence number of the received data packet) is lower than or equal to the maximum sequence number (step S7/NO), the processing shifts to step S31 of FIG. 9. Herein, the overall management unit 311 has received the data packet in step S1 of FIG. 7.

Step S31: the reception loss analysis unit 3151 determines whether or not a sequence number of a received data packet is within the reception node loss range stored in the reception node loss range column in the session information management table T1b of FIG. 2. In other words, when it is determined that a sequence number of a received third data packet is lower than or equal to the maximum sequence number of the already received data packet (step S7/NO), the reception loss analysis unit 3151 executes the following processing. That is, the reception loss analysis unit 3151 determines whether or not the sequence number of the third data packet is higher than or equal to the first sequence number and also is lower than or equal to the second sequence number. See step S15 and step S16 for the first sequence number and the second sequence number.

In a case where this sequence number is within the above-mentioned reception node loss range (step S31/YES (the reception node 2 loss)), the processing shifts to step S32.

Step S32: the reception loss analysis unit 3151 counts up a reception node loss counter configured to count the number of the reception node losses by one. The reception loss analysis unit 3151 stores this reception node loss counter in the memory 32 of FIG. 1 while being associated with the session ID.

In step S31, in a case where the sequence number of the third data packet is lower than or equal to the maximum sequence number of the already received data packet and further is higher than or equal to the first sequence number and also is lower than or equal to the second sequence number, the reception loss analysis unit 3151 determines that a packet loss occurs in the reception node 2. The reception loss analysis unit 3151 then counts up the number of the packet losses occurring in the reception node 2 when it is determined that the packet loss occurs in the reception node 2. The analysis information unit 316 outputs this number to the output apparatus 4.

In step S31, in a case where the sequence number is not within the reception node loss range (step S31/NO), the processing shifts to step S33.

Step S33: the loss analysis unit 315 determines whether or not the sequence number of the received data packet is within the network loss range. Specifically, the loss analysis unit 315 determines whether or not the sequence number of the received data packet is between the ACK number stored in the maximum ACK number column in the session information management table T1b of FIG. 2 and the SACK block stored in the SACK block column the SACK block column in the session information management table T1b. For example, a case is supposed in which this SACK block is Nc-Nd (Nc is an integer, and Nd is an integer higher than Nc). At this time, in a case where the sequence number of the received data packet is higher than or equal to the ACK number stored in the maximum ACK number column and also is lower than Nc, the loss analysis unit 315 determines that the sequence number of the received data packet is within the network loss range.

In a case where the SACK block column stores the first SACK block and the second SACK block, the loss analysis unit 315 determines whether or not the sequence number of the received data packet is between the first and second SACK blocks. For example, a case is supposed in which the first SACK block is Nc-Nd and the second SACK block is Ne-Nf (Ne is an integer lower than Nd, and Nf is an integer higher than Ne). Nc is Left of the first SACK block, Nd is Right of the first SACK block, Ne is Left of the second SACK block, and Nf is Right of the second SACK block. At this time, in a case where the sequence number of the received data packet is higher than Nd and also is lower than Ne, the loss analysis unit 315 determines that the sequence number of the received data packet is within the network loss range.

In a case where the sequence number is within the network loss range (step S33/YES (network loss)), the processing shifts to step S34.

Step S34: the loss analysis unit 315 counts up a network loss counter configured to count the number of network losses by one. The loss analysis unit 315 stores this network loss counter in the memory 32 of FIG. 1 while being associated with the session ID.

In a case where the sequence number of the third data packet is the same as the second ACK number or a case where the sequence number of the third data packet is higher than the second ACK number but is lower than the SACK number stored immediately before, the loss analysis unit 315 performs the following processing. That is, the loss analysis unit 315 determines that the data packet loss occurs in the network N. See step S31 for the third data packet, and see step S13 for the second ACK number.

When it is determined that the packet loss occurs in the network N, the loss analysis unit 315 counts up the number of the packet losses occurring in the network N. The analysis information unit 316 outputs this number to the output apparatus 4.

In step S33, in a case where the sequence number is outside the network loss range (step S33/NO (exceptional retransmission)), the processing shifts to step S35.

Step S35: the loss analysis unit 315 counts up an exceptional retransmission counter configured to count the exceptional retransmission by one. The loss analysis unit 315 stores this exceptional retransmission counter in the memory 32 of FIG. 1 while being associated with the session ID.

This step S35 is executed in the following case. The transmission node 1 transmits the data packet to the reception node 2, and the reception node 2 that has received this data packet transmits the ACK packet to the transmission node 1. Herein, a case is supposed in which a distance between the transmission node 1 and the reception node 2 is long, and a large volume of data communications are executed in the network N. At this time, an arrival time for the ACK packet transmitted by the reception node 2 to reach the transmission node 1 may be largely delayed in some cases. The transmission node 1 then determines that the data packet has not been received by the reception node 2 and transmits the same data packet as the data packet to the reception node 2. In this case, the processing in step S35 is executed.

In step S32, the reception loss analysis unit 3151 stores the counted number of the reception node loss counter in the reception node loss number column in the analysis information table T2 of FIG. 3 at a predetermined time interval (for example, every second). In step S34, the reception loss analysis unit 3151 stores the counted number of the network loss counter in the network loss number column in the analysis information table T2 of FIG. 3 at a predetermined time interval. In step S35, the reception loss analysis unit 3151 stores the counted number of the exceptional retransmission counter in the retransmission number column in the analysis information table T2 of FIG. 3 at a predetermined time interval. In step S6 of FIG. 7, the session information management unit 314 stores the counted number of the received data packet number counter in the packet number column in the analysis information table T2 of FIG. 3 at a predetermined time interval.

Packets in First Specific Example

Packets transmitted and received between the transmission node 1 and the reception node 2 in a first specific example will be described on the basis of FIG. 10 with reference to FIG. 4.

Figure 10:
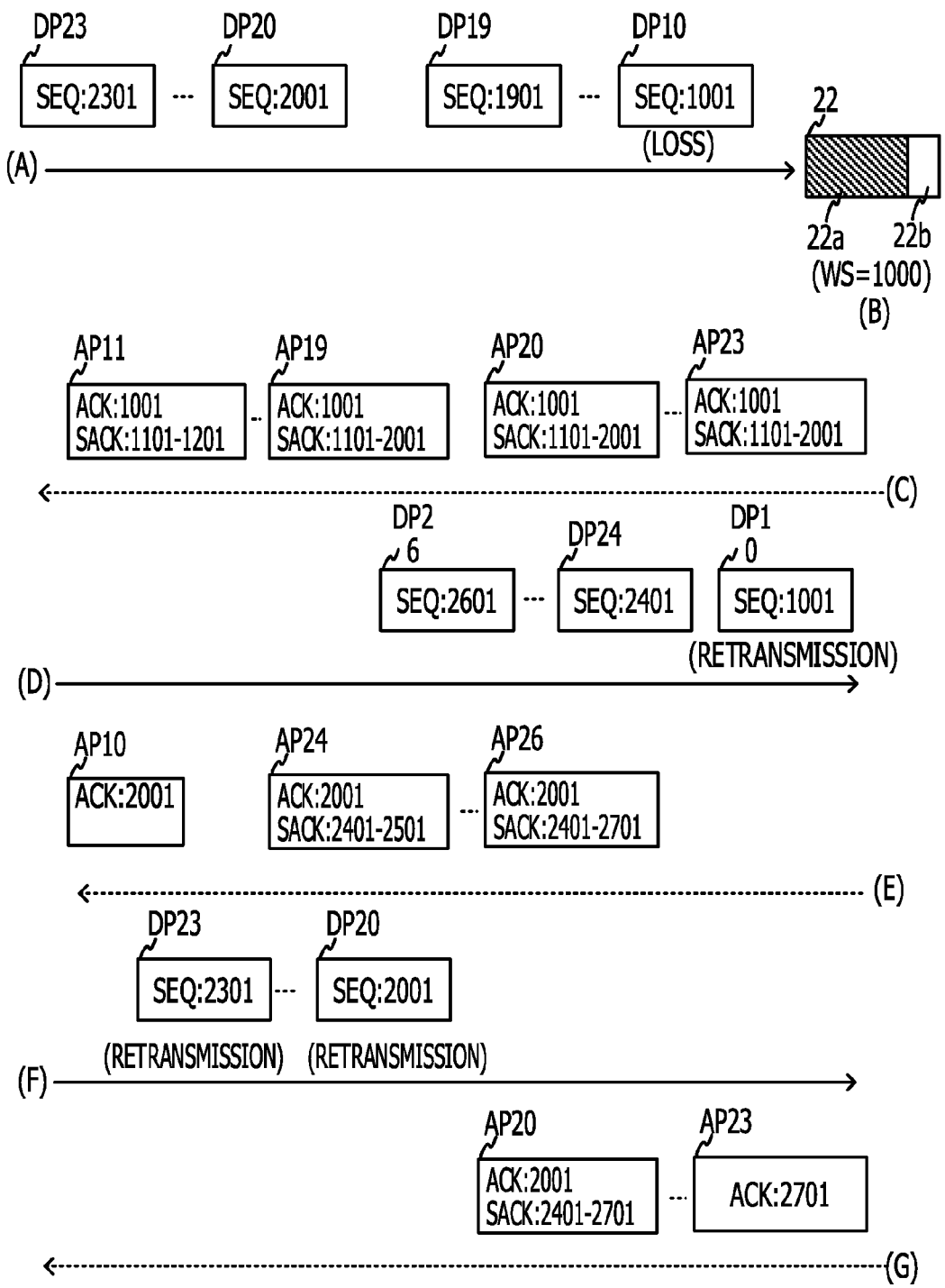
FIG. 10 is an explanatory diagram for describing packets transmitted and received between the transmission node and the reception node in a first specific example.

FIG. 10 is an explanatory diagram for describing the packets transmitted and received between the transmission node 1 and the reception node 2 in the first specific example.

In the following description, the packet length of the data packet is set as 100 bytes, and the window size of the reception node 2 is set as 1000 bytes ((B) of FIG. 10 (see WS=1000)). The first sequence number is set as "1001".

In FIG. 10, solid line arrows (A), (D), and (F) indicating a direction from the transmission node 1 to the reception node 2 represent that the transmission node 1 transmits the data packet to the reception node 2. Dotted line arrows (C), (E), and (G) indicating a direction from the reception node 2 to the transmission node 1 represent that the reception node 2 transmits the ACK packet to the transmission node 1. Blocks denoted by reference signs DP10, DP19, DP20, DP23, DP24, and DP26 schematically represent a data packet, and "SEQ:Na (Na is an integer)" in this block indicates that the sequence number is Na. Blocks denoted by reference signs AP11, AP19, AP20, AP23, AP24, and AP26 schematically represent an ACK packet, "ACK:Nb (Nb is an integer) SACK:Nc (Nc is an integer)-Nd (Nd is an integer)" in this block indicates that the ACK number is Nb, the SACK number of the SACK block is Nc-Nd.

In the data packet transmission represented by the arrow (A), the transmission and reception unit 14 of the transmission node 1 continuously transmits data packets having sequence numbers "1001", "1101", "1201", "1301", "1401", "1501", "1601", "1701", "1801", "1901" to the reception node 2 (see reference sign DP10 to reference sign DP19). Herein, it is assumed that the data packet having sequence number "1001" is lost, for example, in the network N between the reception node 2 and the monitoring apparatus 3. The transmission and reception unit 14 of the transmission node 1 further continuously transmits data packets having sequence numbers "2001", "2101", "2201", and "2301" to the reception node 2 (see reference signs DP20 to DP23).

The transmission and reception unit 21 of the reception node 2 receives the data packets having the sequence numbers "1101" to "1901" to be output to the reception buffer 22 (see FIG. 4). The reception buffer 22 stores the input data packets. A state in which this data packet is stored in the reception buffer 22 is represented by diagonal line hatching denoted by reference sign 22*a* in (B) of FIG. 10. Since the data packet having the sequence number "1001" is lost in the network at this moment, the reception buffer 22 does not store the data packet having the sequence number "1001". At this time, the reception buffer 22 reserves a memory area by the amount corresponding to the size (100 bytes) of this data packet for a preparation of storage processing on the data packet having the sequence number "1001" transmitted from the transmission node 1. The state in which this memory area is reserved is schematically represented by reference sign 22*b* in (B) of FIG. 10.

As described above, the reception buffer 22 does not store the data packet having the missing sequence number "1001". For that reason, the data reassembling unit 23 does not execute the data reassembling processing. As a result, because of the free space shortage of the reception buffer 22, the reception buffer 22 does not store any more data packets.

When the transmission and reception unit 21 of the reception node 2 has received the data packet having the sequence number "1101", the following ACK packet is transmitted in the ACK packet transmission represented by the arrow (C). This ACK packet refers to the ACK packet having the ACK number "1001" indicating the number for specifying the transmission request data and the SACK block "1101-1201". The transmission and reception unit 21 of the reception node 2 further continuously receives the data packets having the sequence numbers "1201", "1301", "1401", "1501", "1601", "1701", "1801", and "1901" and transmits the ACK packet to the transmission node 1 each time one data packet is received. These ACK packets commonly have the ACK number "1001". These ACK packets have the SACK blocks "1101-1301", "1101-1401", "1101-1501", "1101-1601", "1101-1701", "1101-1801", "1101-1901", and "1101-2001", respectively. See reference sign AP11 to reference sign AP19 for the above-mentioned transmission of the ACK packets.

As described above, the transmission and reception unit 14 of the transmission node 1 transmits the data packet having the sequence number "2001" to the reception node 2. The transmission and reception unit 21 of the reception node 2 receives the data packet having the sequence number "2001" but discards the received data packet because of the free space shortage of the reception buffer 22 as described above. In other words, the packet loss occurs in the reception node 2. In view of the above, the transmission and reception unit 21 of the reception node 2 transmits the ACK packet having the ACK number "1001" and the SACK block "1101-2001" to the transmission node 1 (see the arrow in (C) of FIG. 10).

As described above, the transmission and reception unit 14 of the transmission node 1 transmits the data packets having the sequence number "2101" that follows the sequence number "2001", the data packet having the sequence number "2201", and the data packet having the sequence number "2301" to the reception node 2. The transmission and reception unit 21 of the reception node 2 discards the received data packets because of the free space shortage of the reception buffer 22 as described above. In view of the above, the transmission and reception unit 21 of the reception node 2 transmits the ACK packet having the ACK number "1001" and the SACK block "1101-2001" to the transmission node 1 each time the data packet has been received (see reference signs AP20 to AP23 in (C) of FIG. 10).

When three or more ACK packets having the redundant ACK number "1001" have been received, for example, after the transmission of the data packet having the sequence number "2301", the transmission and reception unit 14 of the transmission node 1 retransmits the data packet having the sequence number "1001" to the reception node 2 (see reference sign DP10 in (D) of FIG. 10). Subsequently, the transmission and reception unit 14 of the transmission node 1 sequentially transmits a data packet having a sequence number "2401", a data packet having a sequence number "2501", and a data packet having a sequence number "2601" to the reception node 2 (see reference signs DP24 to DP26 in (D) of FIG. 10).

When the transmission and reception unit 21 of the reception node 2 has received the data packet having the sequence number "1001" (retransmission), the ACK packet having the ACK number "2001" indicating the sequence number of the discarded data packet is transmitted in the ACK packet transmission represented by the arrow (E) (see reference sign AP10). When the data packet having the sequence number "2401" has been received, the transmission and reception unit 21 of the reception node 2 further transmits the ACK packet having the ACK number "2101" and the SACK block "2401-2501" to the transmission node 1 (see reference sign AP24). When the data packet having the sequence number "2501" has been received, the transmission and reception unit 21 of the reception node 2 transmits the ACK packet having the ACK number "2101" and the SACK block "2401-2601" to the transmission node 1. When the data packet having the sequence number "2601" has been received, the transmission and reception unit 21 of the reception node 2 then the ACK packet having the ACK number "2001" and the SACK block "2401-2701" to the transmission node 1 (see reference sign AP26).

When the three or more ACK packets having the redundant ACK number "2001" have been received (see reference signs AP24 to AP26), for example, after the transmission of the data packet having the sequence number "2601", the transmission and reception unit 14 of the transmission node 1 retransmits the following data packets in the data packet transmission represented by the arrow (F). These data packets are the data packet having the sequence number "2001" (see reference sign DP20 of (F)), the data packet having the sequence number "2101", the data packet having the sequence number "2201", and the data packet having the sequence number "2301" (see reference sign DP23 of (F)).

When the data packet having the sequence number "2001" has been received, the transmission and reception unit 21 of the reception node 2 transmits the ACK packet having the ACK number "2101" and the SACK block "2401-2701" (see reference sign AP20) to the transmission node 1 in the ACK packet transmission represented by the arrow (G). When the data packet having the sequence number "2101" has been received, the transmission and reception unit 21 of the reception node 2 transmits the ACK packet having the ACK number "2201" and the SACK block "2401-2701" to the transmission node 1. When the data packet having the sequence number "2201" has been received, the transmission and reception unit 21 of the reception node 2 transmits the ACK packet having the ACK number "2301" and the SACK block "2401-2701" to the transmission node 1. When the data packet having the sequence number "2301" has been received, the transmission and reception unit 21 of the reception node 2 further transmits the ACK packet having the ACK number "2701" (see reference sign AP23) to the transmission node 1. A description of the subsequent packet transmission and reception will be omitted since this is not used for describing the present embodiment.

Processing executed by the monitoring apparatus 3 in first specific example

A description will be given of processing executed by the monitoring apparatus 3 in the first specific example with reference to FIG. 2, FIG. 3, FIG. 7, FIG. 8, FIG. 9, and FIG. 10 on the basis of FIG. 11 and FIG. 12.

FIG. 11 and FIG. 12 are explanatory diagrams for describing processing executed by the monitoring apparatus 3 in the first specific example. A table T4*a* of FIG. 11 has the sequence number column, the ACK column, the SACK 1st block column, the reception node loss possibility range column, the reception node loss range column, and a loss determination column of the data packet. The sequence number column, the ACK column, and the SACK 1st block column are equivalent to the sequence number column, the ACK column, and the SACK 1st block column of FIG. 6. Furthermore, the SACK 1st block column, the reception node loss possibility range column, and the reception node loss range column are equivalent to the SACK block column, the reception node loss possibility range column, and the reception node loss range column in the session information management table T1*b* of FIG. 2. A table T4*b* of FIG. 12 is a table subsequent to the table T4*a* of FIG. 11.

As described in FIG. 7, the handshake packet is transmitted and received between the transmission node 1 and the reception node 2, and a TCP/IP communication session is established between the transmission node 1 and the reception node 2. As a result, the session information management unit 314 newly registers the new session in the session information management table T1*a* of FIG. 2 (steps S1 to S4). At this time, the session information management unit 314 obtains, for example, the window size from the handshake packet. Herein, the window size is set as 1000 (bytes). In the following description, the maximum length (packet length) of the data packet is set as 100 bytes. The transmission node 1 and the reception node 2 further obtain the handshake packet from the first sequence number to be set in a memory (not illustrated) of its own apparatus. Herein, the first sequence number is set as "1001".

The transmission and reception unit 14 of the transmission node 1 continuously transmits the data packets having the sequence numbers "1001", "1101", "1201", "1301", "1401", "1501", "1601", "1701", "1801", and "1901" to the reception node 2 (see reference sign DP10 to reference sign DP19 in (A) of FIG. 10). Herein, if the data packet having the sequence number "1001" is lost, for example, in the network N between the reception node 2 and the monitoring apparatus 3, the transmission and reception unit 21 of the reception node 2 does not receive the data packet having the sequence number "1001".

The transmission and reception unit 21 of the reception node 2 continuously receives the data packets having the sequence numbers "1101", "1201", "1301", "1401", "1501", "1601", "1701", "1801", and "1901", and each time one data packet is received, the ACK packet is transmitted to the transmission node 1. These ACK packets commonly have the ACK number "1001". These ACK packets have "1101-1201", "1101-1301", "1101-1401", "1101-1501", "1101-1601", "1101-1701", "1101-1801", "1101-1901", and "1101-2001" as the SACK blocks, respectively (see reference sign AP11 to reference sign AP19 in (C) of FIG. 10).

Each time the reception unit 312 receives the data packet (step S1), the session information management unit 314 of the monitoring apparatus 3 executes the processing in step S2, step S3 (NO), and step S5 and further extracts the sequence number of the reception data packet and the packet length in step S6 to then shift to step S7.

For example, when the reception unit 312 has received the data packet having the sequence number "1101", the session information management unit 314 extracts the sequence number "1101" and the packet length (100 bytes) from this data packet. The session information management unit 314 then determines whether or not the sequence number extracted in step S6 is higher than or equal to the maximum sequence number (step S7). This maximum sequence number herein is a number stored in the maximum sequence number column in the session information management table T1a of FIG. 2. The maximum sequence number is, for example, 0 upon initialization.

In step S7, the session information management unit 314 determines that the sequence number "1101" is higher than the maximum sequence number of 0 (step S7/YES) and stores the maximum sequence number extracted in step S6 in the maximum sequence number column in the session information management table T1a of FIG. 2.

In step S9, the session information management unit 314 determines whether or not the subtraction number obtained by subtracting the ACK number of the ACK packet received immediately before from the ACK expected number is higher than the window size. In a case where the ACK packet has not yet been received, the above-mentioned ACK number is a value equal to the ACK expected number. In the case of the above-mentioned example, the ACK expected number is "1201" (1101+100). The ACK number is "1201" since the ACK packet has not yet been received. The window size is 1000. Therefore, the session information management unit 314 determines NO in step S9 and returns to the processing in step S1.

When the transmission and reception unit 21 of the reception node 2 receives the data packet having the sequence number "1101", the ACK number "1001" indicating the number for specifying the transmission request data and the ACK packet having the SACK block "1101-1201" are transmitted.

When the reception unit 312 of the monitoring apparatus 3 receives this ACK packet (step S1), the session information management unit 314 executes step S2, step S3 (NO), and step S5 (NO) and shifts to the processing in step S11 of FIG. 8.

The session information management unit 314 determines whether or not the received ACK packet is the packet having the redundant ACK number in step S11. In the above-mentioned example, the session information management unit 314 determines whether or not the ACK number of the received ACK packet "1001" is matched with the ACK number of the ACK packet received immediately before. In a case where the ACK packet received immediately before does not exist, the processing shifts to step S18. The session information management unit 314 stores the ACK number of the received ACK packet "1001" in the maximum ACK number column in the session information management table T1a of FIG. 2 in step S18.

The processing then shifts to step S19 and step S20, but since step S10 of FIG. 7 is not yet executed, the processing shifts to step S21.

In step S21, the session information management unit 314 stores the number of the SACK block of the received ACK packet in the SACK block column in the session information management table T1b of FIG. 2. In the above-mentioned example, a reference is made of a state in which "1101" is stored in the Left column in the SACK 1st block column of FIG. 11, and "1201" is stored in the Right column.

When the reception unit 312 has received the data packet of the sequence number "1201", the session information management unit 314 executes the processing in step S2, step S3 (NO), step S5 (YES), step S6, step S7 (YES), step S8, and step S9 (NO) and returns to the processing in step S1.

The session information management unit 314 also executes the processing in step S2, step S3 (NO), and step S5 (NO) and step S11 of FIG. 8 upon the reception of the ACK packet having the ACK number "1001" and the SACK block "1101-1301" which has been transmitted by the transmission and reception unit 21 of the reception node 2 in response to the reception of the data packet having the sequence number "1201". In step S11, the session information management unit 314 determines that the ACK number of the received ACK packet (in the above-mentioned example, "1001") and the ACK number of the ACK packet received immediately before (in the above-mentioned example, "1001") are matched with each other (step S11/YES) and shifts to step S12.

In step S12, the session information management unit 314 stores the ACK number of the received ACK packet in the redundant ACK number column in the session information management table T1a of FIG. 2 as the redundant ACK number "1001".

In step S13, the session information management unit 314 further determines whether or not the number of the SACK block of the received ACK packet and the number of the SACK block of the ACK packet received immediately before are a same number. In the case of the above-mentioned example, the number of the SACK block of the received ACK packet is "1101-1301", and the number of the SACK block of the ACK packet received immediately before is "1101-1201". Therefore, the session information management unit 314 determines NO in step S13 and shifts to the processing in step S21.

The session information management unit 314 stores the number of the SACK block of the received ACK packet in the SACK block column in the session information management table T1b of FIG. 2 in step S21. In the above-mentioned example, the session information management unit 314 stores "1101" in the Left column in the SACK 1st block column of FIG. 11 and "1301" in the Right column. The processing then returns to step S1 of FIG. 7.

After this, the session information management unit 314 executes the processing in step S2, step S3 (NO), step S5 (YES), step S6, step S7 (YES), step S8, and step S9 (NO) each time the reception unit 312 receives the data packets having the sequence number "1301", "1401", "1501", "1601", "1701", "1801", and "1901" and returns to the processing in step S1.

The session information management unit 314 also executes the processing in step S2, step S3 (NO), and step S5 (NO), and step S11 (YES), step S12, step S13 (NO), and step S21 of FIG. 8 each time the reception unit 312 receives the following ACK packet. This ACK packet refers to the ACK packet having the ACK number "1001" and the SACK block "1101-1401" and the ACK packet having the ACK number "1001" and the SACK block "1101-1501". In addition, this ACK packet refers to the ACK packet having the ACK number "1001" and the SACK block "1101-1601" and the ACK packet having the ACK number "1001" and the SACK block "1101-1701". Furthermore, this ACK packet refers to the ACK packet having the ACK number "1001" and the SACK block "1101-1801", the ACK packet having the ACK number "1001" and the SACK block "1101-1901", and the ACK packet having the ACK number "1001" and the SACK block "1101-2001".

After the data packets having the sequence numbers "1101" to "1901" have been received, as described in (B) of FIG. 10, the transmission and reception unit 21 of the reception node 2 is in a state in which the storage processing for the data packet is not carried out because of the free space shortage of the reception buffer 22.

As described above, the transmission and reception unit 14 of the transmission node 1 transmits the data packet having the sequence number "2001" that follows the sequence number "1901" to the reception node 2. The reception unit 312 of the monitoring apparatus 3 receives this data packet (step S1), and the session information management unit 314 executes step S2, step S3 (NO), step S5 (YES), step S6, step S7 (YES), step S8, and step S9. Herein, the session information management unit 314 stores "2001" as the maximum sequence number in step S8. The ACK expected number is "2101" (2001+100), the ACK number of the ACK packet received immediately before is "1001", and the window size is 1000. Therefore, in step S9, the session information management unit 314 determines YES (2101-1001>1000), and the loss analysis unit 315 updates the reception node loss possibility range in the session information management table T1b of FIG. 2 in step S10. The loss analysis unit 315 sets the starting point number of the reception node loss possibility range as the sequence number of the received data packet in a case where the processing in step S10 is executed for the first time, and the ending point number is set as a value obtained by adding the data length to this sequence number. In the above-mentioned example, the loss analysis unit 315 sets the starting point number "2001" and the ending point number "2101" (2001+ 100) as the reception node loss possibility range in the session information management table T1b of FIG. 2.

As described above, the transmission and reception unit 14 of the transmission node 1 transmits the data packet having the sequence number "2001" to the reception node 2. In this case, as described in FIG. 10, the transmission and reception unit 21 of the reception node 2 discards the received data packet because of the free space shortage of the reception buffer 22 and transmits the ACK packet having the ACK number "1001" and the SACK block "1101-2001" to the transmission node 1.

The reception unit 312 of the monitoring apparatus 3 receives this ACK packet (step S1), and the session information management unit 314 executes step S2, step S3 (NO), and step S5 (NO), and step S11 (YES), step S12, and step S13 of FIG. 8. In step S13, the session information management unit 314 determines whether or not the number of the SACK block of the received ACK packet and the number of the SACK block of the ACK packet received immediately before are a same number. In the case of the above-mentioned example, the number of the SACK block of the received ACK packet is "1101-2001", and the number of the SACK block of the ACK packet received immediately before is "1101-2001". Therefore, the session information management unit 314 determines YES in step S13.

The loss analysis unit 315 determines whether or not the number of the SACK block is lower than or equal to the starting point number of the reception node loss possibility range stored in the reception node loss possibility range column in the session information management table T1b of FIG. 2 in step S14 after step S13. Since the number of the SACK block is "1101-2001", and the starting point number of the reception node loss possibility range is "2001", the loss analysis unit 315 determines YES in step S14 and shifts to the processing in step S15.

The loss analysis unit 315 determines whether or not the reception node loss range exists, that is, whether or not step S16 has been executed. Herein, since step S16 has not yet been executed, the loss analysis unit 315 determines NO in step S15. The loss analysis unit 315 then stores "2001" as the starting point of the reception node loss range and "2101" as the ending point number of the reception node loss range in the reception node loss range column in the session information management table T1b of FIG. 2 in step S16.

Next, the transmission and reception unit 14 of the transmission node 1 transmits the data packet having the sequence number "2101" that follows the sequence number "2001", the data packet having the sequence number "2201", the data packet having the sequence number "2301" to the reception node 2. Each time the reception unit 312 of the monitoring apparatus 3 receives one of the data packets, the session information management unit 314 then executes the processing in step S2, step S3 (NO), step S5 (YES), step S6, step S7 (YES), step S8, and step S9. Herein, each time step S8 is executed, the session information management unit 314 updates the maximum sequence number to "2101", "2201", and "2301". The ACK expected number is updated to "2201" (2101+100), "2301" (2201+100), and "2401" (2301+100) each time step S9 is executed. The ACK number of the ACK packet received immediately before is "1001", and the window size is 1000. Therefore, the session information management unit 314 determines YES each time step S9 is executed. The loss analysis unit 315 then updates the reception node loss possibility range column in the session information management table T1b of FIG. 2 to "2001-2201", "2001-2301", and "2001-2401" each time step S10 is executed.

As described above, the transmission and reception unit 14 of the transmission node 1 transmits the data packet having the sequence number "2101" that follows the sequence number "2001", the data packet having the sequence number "2201", and the data packet having the sequence number "2301" to the reception node 2.

The transmission and reception unit 21 of the reception node 2 transmits the three ACK packets having the ACK number "1001" and the SACK block "1101-2001" to the transmission node 1 each time the data packet is received (see reference signs AP20 to AP23 in (C) of FIG. 10).

The reception unit 312 of the monitoring apparatus 3 receives this ACK packet (step S1), and the session information management unit 314 executes step S2, step S3 (NO), and step S5 (NO), and step S11 (YES), step S12, step S13 (YES), step S14 (YES), and step S15 (YES) of FIG. 8. The loss analysis unit 315 then updates the reception node loss range column in the session information management table T1b of FIG. 2 to "2001-2201", "2001-2301", and "2001-2401" in step S16.

When the three or more ACK packets having the redundant ACK number "1001" have been received, as indicated by reference sign DP10 of (C) of FIG. 10, the transmission and reception unit 14 of the transmission node 1 retransmits the data packet having the sequence number "1001" to the reception node 2.

The reception unit 312 of the monitoring apparatus 3 receives the data packet having the sequence number "1001" (step S1), and the session information management unit 314 executes step S2, step S3 (NO), step S5 (YES), step S6, and step S7. Herein, the sequence number of the reception data packet is "1001", and the maximum sequence number is "2301". Therefore, the session information management unit 314 determines NO in step S7 and shifts to the processing in step S31 of FIG. 9. The reception loss analysis unit 3151 determines whether or not the sequence number of the received data packet is within the reception node loss range stored in the reception node loss range column in the session information management table T1b of FIG. 2. Since this reception node loss range is "2001-2401", the reception loss analysis unit 3151 determines that the sequence number of the received data packet is not within the reception node loss range (step S31/NO) and shifts to the processing in step S33.

The loss analysis unit 315 determines whether or not the sequence number of the received data packet is within the network loss range (step S33). The sequence number of the received data packet is "1001", and the maximum ACK number is "1001". Therefore, the loss analysis unit 315 determines that the sequence number of the received data packet is within the network loss range (step S33/YES) and adds the network loss number through the execution of step S34. The loss analysis unit 315 determines that the network loss has occurred through this determination (see NW loss in the loss determination column of FIG. 11).

When the data packet having the sequence number "1001" has been received, since this data packet is not a data packet that has not been received so far, the transmission and reception unit 21 of the reception node 2 stores the data packet in the reception buffer 22. Since the series of data packets from the sequence number "1001" to the sequence number "1901" are lined up through this storage, the data reassembling unit 23 executes data reassembling processing and outputs the reassembled data to the application 24. The data reassembling unit 23 then clears the reception buffer 22 (also referred to as NULL set). After this, through this clearing, the transmission and reception unit 21 can store the received data packet in the reception buffer 22 without discarding.

When the data packet having the sequence number "1001" has been received, the transmission and reception unit 21 of the reception node 2 further transmits the ACK packet having the ACK number "2001" indicating the sequence number of the data packet lost in the reception to the transmission node 1.

When the reception unit 312 of the monitoring apparatus 3 receives the ACK packet having the ACK number "2001" (step S1), the session information management unit 314 executes step S2, step S3, and step S5 (NO), and step S11 of FIG. 8. Herein, the ACK number of the ACK packet received immediately before is "1001", and the ACK number of the received ACK packet is "2001". Therefore, the session information management unit 314 determines NO in step S11 and stores the ACK number of the received ACK packet "2001" in the maximum ACK number column in the session information management table T1a of FIG. 2 in step S18. Since the starting point number of the reception node loss possibility range stored in the reception node loss possibility range column in the session information management table T1b of FIG. 2 (in the above-mentioned example, "2001") is not lower than the ACK number of the received ACK packet (in the above-mentioned example, "2001"), the starting point number change processing in step S19 is not executed. Since the starting point number of the reception node loss range stored in the reception node loss range column in the session information management table T1b of FIG. 2 (in the above-mentioned example, "2001") is not lower than the ACK number of the received ACK packet (in the above-mentioned example, "2001"), the starting point number change processing in step S20 is not executed.

The session information management unit 314 updates the SACK block. In the above-mentioned example, since the received ACK packet does have the number as the SACK block, 0 is stored in the SACK block column in the session information management table T1b of FIG. 2 (in blank in the example of FIG. 11).

When the retransmission processing of the data packet having the sequence number "1001" has been ended, the application 11 of the transmission node 1 sequentially transmits the data packet having the sequence number "2401", the data packet having the sequence number "2501", and the data packet having the sequence number "2601" to the reception node 2 (see reference signs DP24 to DP26 in (D) of FIG. 10).

Herein, when the reception unit 312 of the monitoring apparatus 3 has received, for example, the data packet having the sequence number "2401" (step S1), the session information management unit 314 executes the processing in step S2, step S3 (NO), step S5 (YES), step S6, and step S7. Since the sequence number of the received data packet is "2401" and the maximum sequence number is "2301", the session information management unit 314 determines YES in step S7 and executes the processing in step S8 and step S9. Since the ACK expected number is "2501" (2401+100) and the ACK number of the ACK packet received immediately before is "2001", the session information management unit 314 determines NO in step S9 and returns to the processing in step S1.

The session information management unit 314 of the monitoring apparatus 3 executes step S2, step S3 (NO), step S5 (YES), step S6, step S7 (YES), step S8, and step S9 (NO) each time the reception unit 312 receives the data packet having the sequence number "2501" and the data packet having the sequence number "2601". The session information management unit 314 updates the maximum sequence number column in the session information management table T1a of FIG. 2 to "2501" and "2601" each time step S8 is executed.

The transmission and reception unit 21 of the reception node 2 transmits the ACK packet having the ACK number "2101" and the SACK block "2401-2501" to the transmission node 1 when the data packet having the sequence number "2401" has been received (see reference sign AP24 of FIG. 10) and transmits the ACK packet having the ACK number "2101" and the SACK block "2401-2601" to the transmission node 1 when the data packet having the sequence number "2501" has been received. The transmission and reception unit 21 of the reception node 2 then transmits the ACK packet having the ACK number "2001" and the SACK block "2401-2701" to the transmission node 1 when the data packet having the sequence number "2601" has been received (see reference sign AP26 of FIG. 10).

Each time the reception unit 312 receives the above-mentioned three ACK packets, the session information management unit 314 executes the processing in step S2, step S3 (NO), and step S5 (NO), and step S11 (YES), step S12, step S13 (NO), and step S21 of FIG. 8. Since the three ACK numbers of the ACK packets are the same with each other, YES is determined in step S11, and since the SACK blocks of the three ACK packets are different from each other, NO is determined in step S13. As a result, the session information management unit 314 updates the SACK block column in the session information management table T1b of FIG. 2 to "2401-2501", "2401-2601", and "2401-2701" each time step S21 is executed.

When the three ACK packets having the redundant ACK number "2001" have been received, for example, after the transmission of the data packet having the sequence number "2601", the transmission and reception unit 14 of the transmission node 1 retransmits the following data packets. The data packets are the data packets having the sequence number "2001", the sequence number "2101", the sequence number "2201", and the sequence number "2301" (see reference signs DP20 to DP23 in (F) of FIG. 10).

Each time the reception unit 312 of the monitoring apparatus 3 receives the four data packets (step S1), the session information management unit 314 executes step S2, step S3 (NO), step S5 (YES), step S6, and step S7. Herein, the four sequence numbers of the reception data packets are "2001", "2101", "2201", and "2301", and the maximum sequence number is "2601". Therefore, the session information management unit 314 determines NO in step S7 and shifts to the processing in step S31 of FIG. 9. The reception loss analysis unit 3151 determines whether or not the sequence number of the received data packet is within the reception node loss range stored in the reception node loss range column in the session information management table T1b of FIG. 2. This reception node loss range in the reception of the data packet having the sequence number "2001" is "2001-2401". As illustrated in FIG. 11, the ending point number of the reception node loss range is updated from "2101" to "2201", "2301", and "2401" in accordance with the reception of the ACK packet. Therefore, the reception loss analysis unit 3151 determines that the sequence number of the received data packet "2001" is within the reception node loss range ("2001-2401") (step S31/YES) and shifts to step S32. It is determined through this determination that the reception node loss occurs (see reception loss in the loss determination column in FIG. 12). The reception loss analysis unit 3151 adds the reception node loss number through the execution of step S32. That is, the reception loss analysis unit 3151 executes step S32 each time the reception unit 312 receives the four data packets and adds the reception node loss number.

When the data packet having the sequence number "2001" has been received, the transmission and reception unit 21 of the reception node 2 transmits the ACK packet having the ACK number "2101" and the SACK block "2401-2701" to the transmission node 1. When the data packet having the sequence number "2101" has been received, the transmission and reception unit 21 of the reception node 2 transmits the ACK packet having the ACK number "2201" and the SACK block "2401-2701" to the transmission node 1. When the data packet having the sequence number "2201" has been received, the transmission and reception unit 21 of the reception node 2 then transmits the ACK packet having the ACK number "2301" and the SACK block "2401-2701" to the transmission node 1. When the data packet having the sequence number "2301" has been received, the transmission and reception unit 21 of the reception node 2 further transmits the ACK packet having the ACK number "2701" to the transmission node 1.

Each time the reception unit 312 receives the first three ACK packets, the session information management unit 314 executes the processing in step S2, step S3 (NO), and step S5 (NO), and step S11 (YES), step S12, step S13 (NO), and step S21 of FIG. 8. The ACK number of the ACK packet received immediately before the reception of the ACK packet having the ACK number "2101" and the SACK block "2401-2701" is "2001", and the ACK numbers of the three ACK packets are not "2001" and are mutually different. For that reason, NO is determined in step S11. Therefore, each time the reception unit 312 receives the first three ACK packets, the session information management unit 314 executes the processing in steps S18 to S21. "2001-2401" is stored in the reception node loss possibility range column, and the reception node loss range column in the session information management table T1b of FIG. 2 before the reception of the ACK packet having the ACK number "2101" and the SACK block "2401-2701".

Therefore, after the reception of the ACK packet having the ACK number "2101" and the SACK block "2401-2701", the session information management unit 314 executes the following processing. That is, the session information management unit 314 stores "2101-2401" in the reception node loss possibility range column, and the reception node loss range column in the session information management table T1b of FIG. 2 through the execution of step S18 and step S19. The session information management unit 314 further stores "2201-2401" in the reception node loss possibility range column and the reception node loss range column in the session information management table T1b after the reception of the ACK packet having the ACK number "2201" and the SACK block "2401-2701" (see steps S18 and S19). The session information management unit 314 further stores "2301-2401" in the reception node loss possibility range column and the reception node loss range column in the session information management table T1b after the reception of the ACK packet having the ACK number "2301" and the SACK block "2401-2701" (see steps S18 and S19). The monitoring apparatus 3 executes the processing described in FIG. 11 until the session ends.

Second Specific Example

Figure 13:
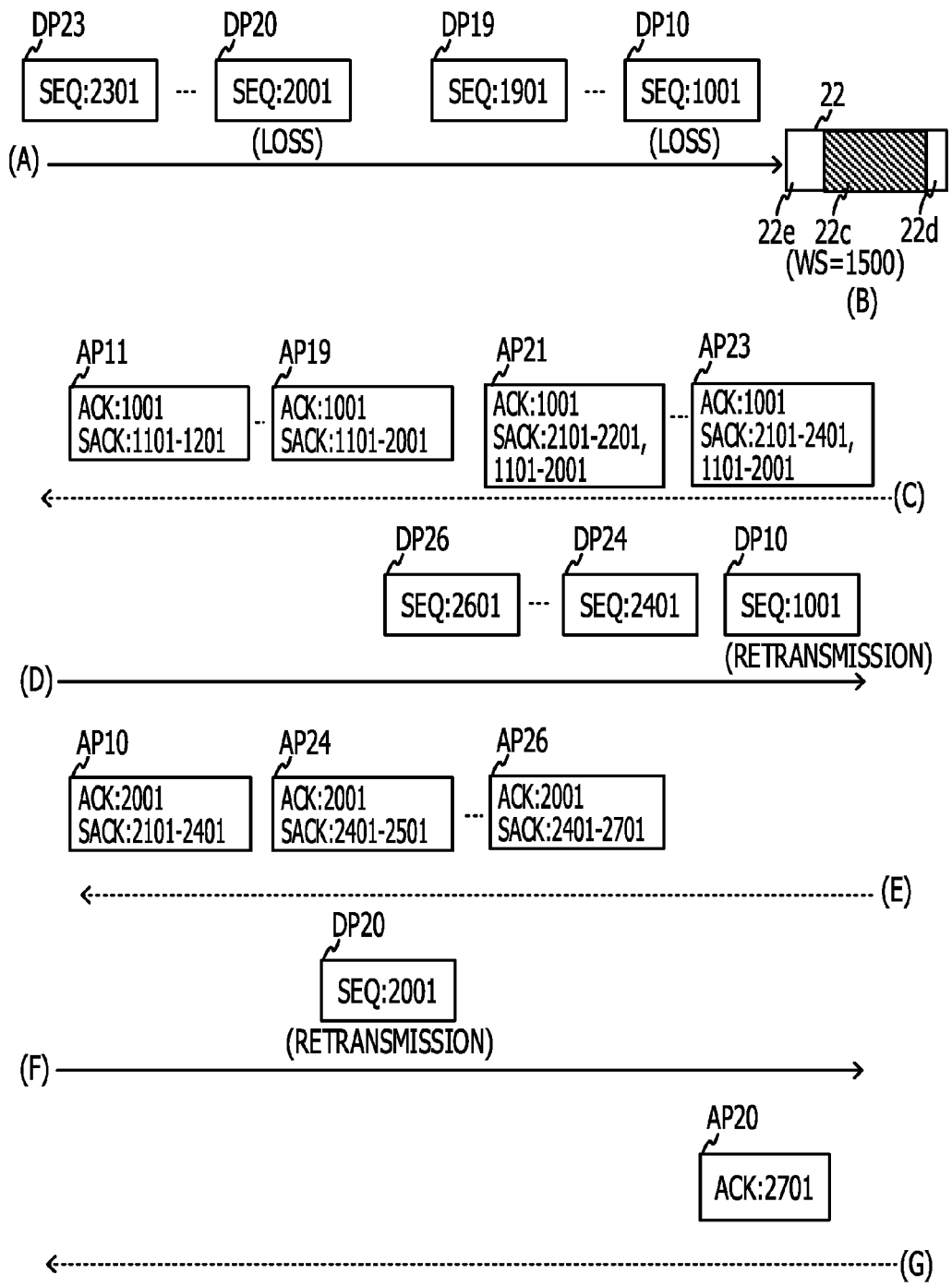
FIG. 13 is an explanatory diagram for describing packets transmitted and received between the transmission node and the reception node in a second specific example.

Packets transmitted and received between the transmission node 1 and the reception node 2 in a second specific example will be described on the basis of FIG. 13 with reference to FIG. 4. FIG. 13 is an explanatory diagram for describing the packets transmitted and received between the transmission node 1 and the reception node 2 in the second specific example.

In the following description, the packet length of the data packet is set as 100 bytes, and the window size of the reception node 2 is set as 1500 bytes ((see WS=1500) in (B) of FIG. 13). The first sequence number is set as "1001".

In FIG. 13, contents represented by solid line arrows and dotted line arrows are the same as those in FIG. 10. Blocks denoted by reference signs DP10, DP19, DP20, DP23, DP24, and DP26 schematically illustrate data packets similarly as in FIG. 10. Blocks denoted by reference signs AP10, AP11, AP19, AP21, AP23, AP24, and AP26 schematically illustrate ACK packet.

In FIG. 13, similarly as in FIG. 10, the transmission and reception unit 14 of the transmission node 1 continuously transmits the data packets denoted by reference sign DP10 to reference sign DP19 and further the data packets denoted by reference sign DP20 to reference sign DP23 to the reception node 2 in the data packet transmission represented by the arrow (A). Herein, for example, the data packet denoted by reference sign DP10 and the data packet denoted by reference sign DP20 are lost in the network N between the reception node 2 and the monitoring apparatus 3.

As described in FIG. 10, the reception buffer 22 stores the data packet having the sequence number "1101" to the data packet having the sequence number "1901" (see reference sign DP19) while a storage area for the data packet having the sequence number "1001" (see reference sign DP10) is reserved (see reference sign 22d in (B) of FIG. 13). Since the storable capacity (window size) of the reception buffer 22 is 1500 bytes, the reception buffer 22 can further store the data packet having the sequence number "2101" to the data packet having the sequence number "2301" (see reference sign DP23). A state in which this data packet is stored in the reception buffer 22 is represented by diagonal line hatching denoted by reference sign 22c in (B) of FIG. 13. Since the storable capacity (window size) of the reception buffer 22 is 1500 bytes even in the storage state of the reception buffer 22, the free space for storing the subsequent data packets exists (see reference sign 22e in (B) of FIG. 13).

As described in FIG. 10, each time the transmission and reception unit 21 of the reception node 2 receives the data packet having the sequence number "1101" to the data packet having the sequence number "1901", the ACK packets denoted by reference sign AP11 to reference sign AP19 are transmitted to the transmission node 1 in the ACK packet transmission represented by the arrow (C). Furthermore, each time the transmission and reception unit 21 of the reception node 2 receives the data packet having the sequence number "2101" to the data packet having the sequence number "2301", the ACK packets denoted by reference sign AP21 to reference sign AP23 are transmitted to the transmission node 1. The ACK packets denoted by reference sign AP21 to reference sign AP23 commonly have the ACK number "1001" indicating the number for specifying the transmission request data. These ACK packets further have SACK:2101-2201, 1101-2001, SACK:2101-2301, 1101-2001, and SACK:2101-2401, 1101-2001 as the SACK blocks, respectively.

When the three or more ACK packets having the redundant ACK number "1001" have been received, for example, after the transmission of the data packet having the sequence number "2301", the transmission and reception unit 14 of the transmission node 1 retransmits the data packet having the sequence number "1001" to the reception node 2 (see reference sign DP10 in (D) of FIG. 13). Subsequently, the transmission and reception unit 14 of the transmission node 1 transmits the data packets denoted by reference sign DP24 to reference sign DP26 to the reception node 2.

When the transmission and reception unit 21 of the reception node 2 has received the data packet having the sequence number "1001" (retransmission), the following ACK packet is transmitted in the ACK packet transmission represented by the arrow (E). This ACK packet refers to the ACK packet (see reference sign AP10) having the ACK number "2001" and the SACK block "2101-2401" indicating the number for specifying the transmission request data. Each time the data packets denoted by reference sign DP24 to reference sign DP26 are received, the transmission and reception unit 21 of the reception node 2 further transmits the ACK packets denoted by reference sign AP24 to reference sign AP26 to the transmission node 1. The ACK packets denoted by reference sign AP24 to reference sign AP26 commonly have the ACK number "2001".

When the three or more ACK packets having the redundant ACK number "2001" have been received (see reference signs AP24 to AP26), for example, after the transmission f the data packet denoted by reference sign DP26, the transmission and reception unit 14 of the transmission node 1 retransmits the data packet denoted by reference sign DP20 in the data packet transmission represented by the arrow (F).

When the data packet denoted by reference sign DP20 has been received, the transmission and reception unit 21 of the reception node 2 transmits the ACK packet denoted by reference sign AP20 to the transmission node 1 in the ACK packet transmission represented by the arrow (G). The ACK packet denoted by reference sign AP20 has the ACK number "2701". A description of the subsequent packet transmission and reception will be omitted since this is not used for describing the present embodiment.

Processing executed by the monitoring apparatus 3 in second specific example

Processing executed by the monitoring apparatus 3 will be described in a second specific example with reference to FIG. 2, FIG. 3, FIG. 7, FIG. 8, FIG. 9, and FIG. 13 on the basis of FIG. 14.

FIG. 14 is an explanatory diagram for describing the processing executed by the monitoring apparatus 3 in the second specific example. A table T5 of FIG. 14 is obtained by adding the SACK 2nd block column to the table described in FIG. 11 and FIG. 12.

A description of processing by the session information management unit 314 to newly register the new session in the session information management table T1a of FIG. 2 (steps S1 to S4) will be omitted since the description has made with reference to FIG. 11. The session information management unit 314 obtains, for example, 1500 (bytes) from the handshake packet as the window size in this new registration processing. The first sequence number is set as "1001", and the maximum length (packet length) of the data packet is set as 100 bytes.

The transmission and reception unit 14 of the transmission node 1 continuously transmits the data packets having the sequence numbers "1001", "1101", "1201", "1301", "1401", "1501", "1601", "1701", "1801", and "1901" to the reception node 2. At this time, as described in FIG. 11 and FIG. 13, it is assumed that the data packet having the sequence number "1001" is lost in the network N on the monitoring apparatus 3 or subsequent apparatus. As described in FIG. 11, when the data packet transmitted from the transmission node 1 has been received, as described in FIG. 11 and FIG. 13, the reception node 2 transmits the ACK packet to the transmission node 1.

A description of processing to be executed by the monitoring apparatus 3 after the reception of the above-mentioned data packet and processing executed on the above-mentioned ACK packet will be omitted since the description has made with reference to FIG. 11. The session information management unit 314 of the monitoring apparatus 3 stores "1901" as the maximum sequence number in the maximum sequence number column in the session information management table T1a of FIG. 2 through the reception of the data packet having the sequence number "1901". The session information management unit 314 of the monitoring apparatus 3 also stores "1101" as the maximum ACK number in the maximum ACK number column in the session information management table T1a of FIG. 2 after the reception of the ACK packet having the ACK number "1101" and the SACK number "1101-2001". The session information management unit 314 of the monitoring apparatus 3 further stores the SACK number "1101-2001" in the SACK block column in the session information management table T1b of FIG. 2 after the above-mentioned reception.

As described above, the transmission and reception unit 14 of the transmission node 1 transmits the data packet having the sequence number "2001" that follows the sequence number "1901" to the reception node 2. The reception unit 312 of the monitoring apparatus 3 receives this data packet (step S1), and the session information management unit 314 executes the processing in step S2, step S3 (NO), step S5 (YES), step S6, step S7 (YES), step S8, and step S9. Herein, the session information management unit 314 stores "2001" as the maximum sequence number in step S8. The ACK expected number is "2101" (2001+100), the ACK number of the ACK packet received immediately before is "1001", and the window size is 1500. Therefore, the session information management unit 314 determines NO (2101-1001<1500) in step S9 and returns to the processing in step S1.

As described in FIG. 13, the transmission and reception unit 14 of the transmission node 1 transmits the data packet having the sequence number "2101", the data packet having the sequence number "2201", and the data packet having the sequence number "2301". When these three data packets have been received, the monitoring apparatus 3 executes the same processing as that executed in a case where the data packet having the sequence number "2001" has been received. Upon the reception of the data packet having the sequence number "2301", the session information management unit 314 stores "2301" as the maximum sequence number.

As described in FIG. 13, the data packet having the sequence number "2001" is lost in the network N on the monitoring apparatus 3 or subsequent apparatus.

Each time the data packet having the sequence number "2101", the data packet having the sequence number "2201", and the data packet having the sequence number "2301" are received, the transmission and reception unit 21 of the reception node 2 transmits the following ACK packet to the transmission node 1. This ACK packet refers to the ACK packet having the ACK number "1001", the first SACK block "2101-2201", and the second SACK block "1101-2001" (see reference sign AP21 of FIG. 13) and the ACK packet having the ACK number "1001", the first SACK block "2101-2301", and the second SACK block "1101-2001". This ACK packet further refers to the ACK packet having the ACK number "1001", the first SACK block "2101-2401", and the second SACK block "1101-2001" (see reference sign AP23 of FIG. 13).

When the reception unit 312 of the monitoring apparatus 3 has received these ACK packets (step S1), the session information management unit 314 executes step S2, step S3 (NO), and step S5 (NO) and shifts to the processing in step S11 of FIG. 8. Since the ACK numbers of the already received ACK packets are the same number "1001", the session information management unit 314 executes step S11 (YES) and step S12 and shifts to the processing in step S13. Since the SACK blocks of the already received ACK packets are all different from each other, the session information management unit 314 executes step S13 (NO) and step S21. In step S21, the session information management unit 314 stores the SACK block of the received ACK packet in the SACK block column in the session information management table T1b of FIG. 3. In the case of the ACK packet having the first SACK block "2101-2401" and the second SACK block "1101-2001", the session information management unit 314 stores the first SACK block and the second SACK block, respectively, in the SACK 1st block column and the SACK 2nd block column of the SACK block column in the session information management table T1b of FIG. 2.

When the three or more ACK packets having the redundant ACK number "1001" have been received, the transmission and reception unit 14 of the transmission node 1 retransmits the data packet having the sequence number "1001" to the reception node 2.

The reception unit 312 of the monitoring apparatus 3 receives the data packet having the sequence number "1001" (step S1), and the session information management unit 314 executes step S2, step S3 (NO), step S5 (YES), step S6, and step S7. Herein, the sequence number of the reception data packet is "1001", and the maximum sequence number is "2301". Therefore, the session information management unit 314 determines NO in step S7 and shifts to the processing in step S31 of FIG. 9. The reception loss analysis unit 3151 determines whether or not the sequence number of the received data packet is within the reception node loss range stored in the reception node loss range column in the session information management table T1b of FIG. 2. Since this reception node loss range is 0 at this moment, the reception loss analysis unit 3151 determines that the sequence number of the received data packet is not within the reception node loss range (step S31/NO) and shifts to the processing in step S33.

The loss analysis unit 315 determines whether or not the sequence number of the received data packet is within the network loss range (step S33). The sequence number of the received data packet is "1001", and the maximum ACK number is "1001". Therefore, the loss analysis unit 315 determines that the sequence number of the received data packet is within the network loss range (step S33/YES) and adds the network loss number through the execution of step S34. It is determined that the network loss has occurred through this determination (see NW loss in the loss determination column in FIG. 14).

When the data packet having the sequence number "1001" has been received, the transmission and reception unit 21 of the reception node 2 stores the data packet in the reception buffer 22 since this data packet has not been received so far. A description of processing executed by the data reassembling unit 23 after this has been made with reference to FIG. 11, and the description thereof will be omitted.

When the data packet having the sequence number "1001" has been received, the transmission and reception unit 21 of the reception node 2 further transmits the ACK packet having the ACK number "2001" and the SACK block "2101-2401" to the transmission node 1.

When the reception unit 312 of the monitoring apparatus 3 has received the ACK packet having this ACK number "2001" (step S1), the session information management unit 314 executes step S2, step S3, and step S5 (NO) and step S11 of FIG. 8. Herein, the ACK number of the ACK packet received immediately before is "1001", and the ACK number of the received ACK packet is "2001". Therefore, the session information management unit 314 determines NO in step S11 and stores the ACK number of the received ACK packet "2001" in the maximum ACK number column in the session information management table T1a of FIG. 2 in step S18.

The SACK block of the ACK packet received immediately before corresponds to the first SACK block "2101-2401" and the second SACK block "1101-2001", and the SACK block of the received ACK packet is the first SACK block "2101-2401". Therefore, since the SACK blocks of those ACK packets are different from each other, the session information management unit 314 determines NO in step S13 and stores the SACK block of the received ACK packet in the SACK block column in the session information management table T1b of FIG. 3.

Subsequently, the transmission and reception unit 14 of the transmission node 1 sequentially transmits the following data packets to the reception node 2 after the retransmission of the data packet having the sequence number "1001". The data packets refer to the data packet having the sequence number "2401", the data packet having the sequence number "2501", and the data packet having the sequence number "2601" (see reference signs DP24 to DP26 in (D) of FIG. 13).

When the reception unit 312 of the monitoring apparatus 3 has received these three data packets (step S1), the session information management unit 314 executes the processing in step S2, step S3 (NO), step S5 (YES), step S6, step S7 (YES), step S8, and step S9 (NO). Herein, the session information management unit 314 stores "2601" as the maximum sequence number upon the execution of step S8 at the last.

Each time the three data packet sequentially transmitted from the transmission node 1 are received, the transmission and reception unit 21 of the reception node 2 transmits the following ACK packets to the transmission node 1. The ACK packets refers to the ACK packet having the ACK number "2001" and the first SACK block "2401-2501", the ACK packet having the ACK number "2001" and the first SACK block "2401-2601", and the ACK packet having the ACK number "2001" and the first SACK block "2401-2701".

When the reception unit 312 of the monitoring apparatus 3 have received these three ACK packets (step S1), the session information management unit 314 executes step S2, step S3 (NO), and step S5 (NO) and shifts to the processing in step S11 of FIG. 8. Since the ACK numbers of the already received ACK packets are all the same number "2001", the session information management unit 314 executes step S11 (YES) and step S12 and shifts to the processing in step S13. Since the SACK blocks of the already received ACK packets are all different from each other, the session information management unit 314 executes step S13 (NO) and step S21.

When the three or more ACK packets having the redundant ACK number "2001" have been received, the transmission and reception unit 14 of the transmission node 1 retransmits the data packet having the sequence number "2001" to the reception node 2.

The reception unit 312 of the monitoring apparatus 3 receives the data packet having the sequence number "2001" (step S1), and the session information management unit 314 executes step S2, step S3 (NO), step S5 (YES), step S6, and step S7. Herein, the sequence number of the reception data packet is "2001", and the maximum sequence number is "2601". Therefore, the session information management unit 314 determines NO in step S7 and shifts to the processing in step S31 of FIG. 9. As described above, since the reception node loss range is 0 at this moment, the loss analysis unit 315 determines NO in step S31 (NO) and shifts to the processing in step S33.

The sequence number of the received data packet is "2001", and the maximum ACK number is "2001". Therefore, the loss analysis unit 315 determines that the sequence number of the received data packet is within the network loss range (step S33/YES) and adds the network loss number through the execution of step S34. The monitoring apparatus 3 executes the processing described in FIG. 14 until the session is ended.

Display Output

Processing of displaying a monitoring result of the data packet which is executed by the above-mentioned monitoring result will be described with reference to FIG. 3 and FIG. 4.

When a session identified, for example, by a session ID has ended, the analysis information unit 316 displays and outputs the analysis information table T2 of FIG. 3 to the output apparatus 4 as it is. As illustrated in FIG. 3, the network loss number, the reception node loss number, and the retransmission number are stored while corresponding to the session ID. For that reason, the administrator grasps the packet loss rate in units of session. The administrator can perform a cause analysis of a communication abnormity in units of session through this grasp.

As illustrated in FIG. 2, the monitoring apparatus stores also stores the transmission source IP address and the transmission destination IP address while corresponding to the session ID. With the transmission source IP address and the transmission destination IP address, the administrator can specify the transmission node and the reception node corresponding to the session ID. For that reason, the administrator can grasp the rate of the packet losses (network loss rate) occurring in the network between the transmission node and the reception node identified by the above-mentioned IP address. The administrator can also grasp the rate of the packet losses (reception node loss rate) occurring in this reception node. As a result, it is facilitated to perform the cause analysis of the packet loss.

For example, in a case where the packet losses occur at a high frequency in the network, the administrator analyzes that the cause of the packet loss is at the network and takes the following measures. The administrator increases the transmission and reception buffer capacities of the network device such as a switch apparatus or improves the processing performance, for example. In addition, the fault of the network device is solved, and the quality improvement of the network device is aimed. The administrator can suppress the generation frequency of the packet losses in the network through the measures.

On the other hand, in a case where the packet losses occur in the reception node at a high frequency, the administrator analyzes that the cause of the packet loss is at the reception node and takes the following measures. The administrator increases the reception buffer capacity of the reception node and performs defect measures on the communication program, for example. The administrator can suppress the generation frequency of the packet losses in the reception node through the measures.

In a large-scale network system such as a data center, in particular, the monitoring apparatus according to the present embodiment is useful in a case where an operator that constructs and manages the network is different from an operator that installs and manages the reception node. According to this monitoring apparatus, it is possible to determine the packet loss in the reception node or the packet loss in the network loss, and which operator has the cause of the packet loss can appropriately be distinguished. As a result, it is easier for the administrator of the data center to determine the operator that is to perform the measures for the packet loss, and the administrator can instruct the packet loss measures to the operator.

When the session identified, for example, by the session ID has ended, the analysis information unit 316 of FIG. 4 obtains the packet number for each time and date, the network loss number stored the time and date column of FIG. 3, the reception node loss number, and the retransmission number corresponding to this session ID from FIG. 3. The analysis information unit 316 then calculates, for example, the reception node loss rate and the network loss rate for each time and date. Herein, the reception node loss rate refers to a value obtained by dividing the reception node loss number at the time and date by the packet number at the time and date. The network loss rate refers to a value obtained by dividing the network loss number at the time and date by the packet number at the time and date. The analysis information unit 316 then changes the reception node loss rate and the network loss rate calculated in a time series manner, for example, into data in a graphic format to be displayed and output via the output interface 34 onto the output apparatus 4.

Figure 15:
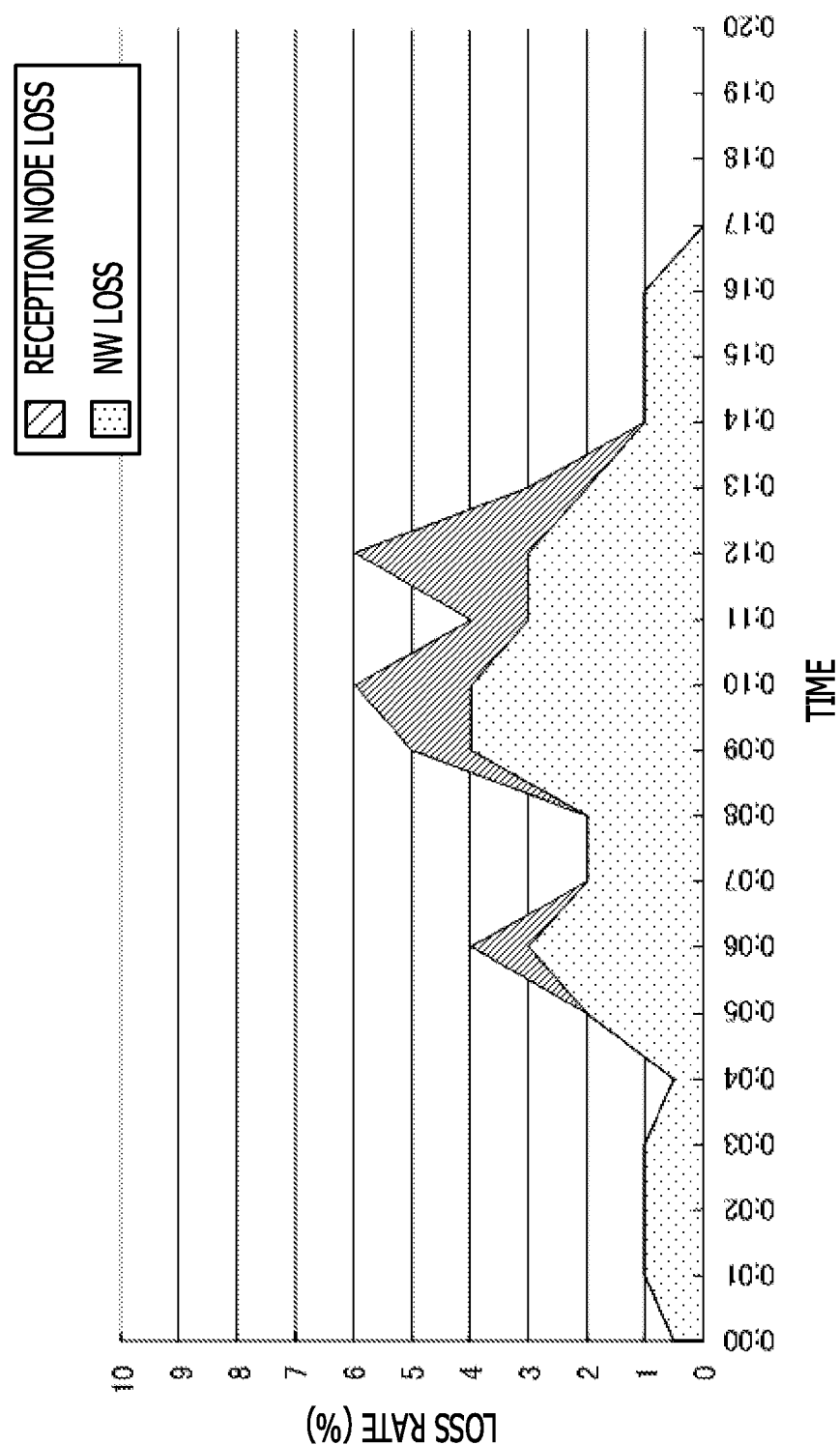
FIG. 15 is a graph chart example illustrating a reception node loss rate and a network loss rate calculated in a time series manner in the form of area charts.

FIG. 15 is a graph chart example illustrating the reception node loss rate and the network loss rate calculated in a time series manner in the form of area charts.

Figure 16:
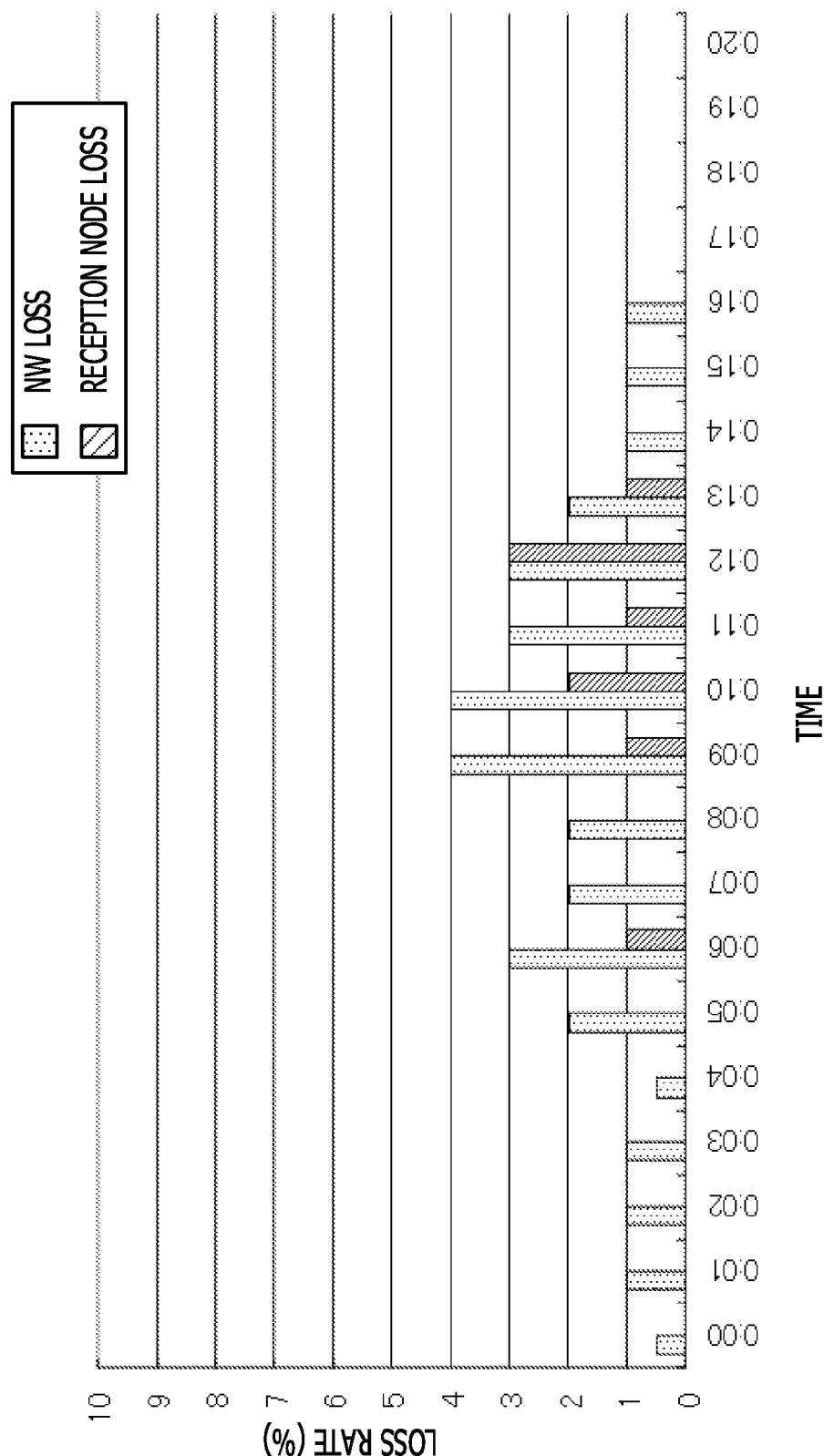
FIG. 16 is a graph chart example illustrating the reception node loss rate and the network loss rate calculated in a time series manner in the form of bar charts.

FIG. 16 is a graph chart example illustrating the reception node loss rate and the network loss rate calculated in a time series manner in the form of bar charts.

In FIG. 15 and FIG. 16, the vertical line indicates the loss rate corresponding to the reception node loss rate and the network loss rate in percentage, and the horizontal line indicates the time and date. In FIG. 15 and FIG. 16, the network loss is referred to as NW loss. To simplify the drawing, the horizontal line only indicates the time. In FIG. 15 and FIG. 16, the reception node loss rate is represented by diagonal line hatching, and the network loss rate is represented by dot hatching.

Thus, it is possible for the administrator of the network to visualize in which time period the packet loss tends to occur through the graphic display of the reception node loss rate and the network loss rate calculated in a time series manner. The administrator can perform the cause analysis of the packet loss and various measures on the packet loss while verifying the network use situation in this time period through this visualization.

As illustrated in FIG. 2, the monitoring apparatus further stores the port number while corresponding to the session ID. For that reason, the grasp of the packet loss rate in units of session is synonymous with the grasp of the packet loss rate in units of port number used by the transmission node and the reception node that execute the session identified by the session ID. Herein, for example, a case is supposed in which the packet loss rate is high with a particular port number. In this case, the administrator can take into account a possibility that the packet loss tends to occur in a communication pattern particular to an application where the communication is conducted by using this particular port number in the cause analysis of the packet loss. As a result, the cause analysis of the packet loss can be facilitated.

In addition, a case is supposed in which a certain transmission node and plural reception nodes execute a packet communication. In this case, the administrator can grasp the rate of the packet losses in the packet communication between the certain transmission node and the plural reception nodes. As a result, for example, in a case where the packet loss rate in the packet communication between the certain transmission node and the certain plural reception nodes is high, it is possible to take into account the possibility that the cause of the packet loss is at the network between the certain transmission node and the certain plural reception nodes or the particular reception node. The above-mentioned possibility can be taken into account similarly also in a case where plural transmission nodes and a certain reception node perform the packet communication.

A case is supposed in which plural sub nets exist beyond the mirror port MP of the monitoring apparatus 3 and the plural reception nodes connected to a certain sub net exist. In this case, the administrator can grasp a packet loss rate in a packet communication between the certain transmission node and the plural reception nodes in the certain sub net. For that reason, the administrator can grasp the total packet loss rate for each subject by adding the packet loss rate in the certain subnet. As a result, for example, in a case where the total packet loss rate of the first sub net is relatively higher than the total packet loss rate of the other second sub net, it is possible to estimate that the failure particular to the first sub net occurs. The failure occurrence location can quickly be specified through this estimation.

As described above, since the packet loss rate can be grasped in units of session, it is possible to perform the cause analysis of the packet loss at various granularities and combinations.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A monitoring apparatus, comprising:
   a memory; and
   a processor coupled to the memory and configured to:
      receive plural acknowledgment packets each including an identifier for identifying a packet and information indicating selective acknowledgment which are transmitted from a reception node that has received a data packet transmitted from a transmission node via a network to the transmission node via the network,
      determine that a data packet loss occurs in the reception node when a first identifier and first information included in a first acknowledgment packet among the plural acknowledgment packets are respectively matched with a second identifier and second information included in a second acknowledgment packet received after the first acknowledgment packet among the plural acknowledgment packets,
      determine that the data packet loss occurs in the network when the first identifier is matched with the second identifier and the first information is different from the second information,
      count up a number of the packet loss occurring in the reception node and in the network, and
      output the counted-up number of packet loss occurring in the reception node and in the network,
      wherein transmission buffer capacity and reception buffer capacity of a network device that relays the packet in the network are increased when the data packet loss occurs in the network.

2. The monitoring apparatus according to claim 1,
   wherein the processor is configured to:
      determine that a total data amount of continuously received data packets exceeds a receivable amount of the reception node on the basis of a sequence number of the received data packet and an identifier of the acknowledgment packet,
      store, when the total data amount exceeds the receivable amount of the reception node and also the first identifier and the first information are respectively matched with the second identifier and the second information, a first sequence number of a first data packet received beyond the receivable amount and a second sequence number of a second data packet received after the first data packet in the memory,
      determine whether a sequence number of a received third data packet is lower than or equal to a maximum sequence number of the already received data packet, is higher than or equal to the first sequence number, and also is lower than or equal to the second sequence number, and determine that the packet loss occurs in the reception node when the sequence number of the third data packet is lower than or equal to the maximum sequence number of the already received data packet, is higher than or equal to the first sequence number, and also is lower than or equal to the second sequence number.

3. The monitoring apparatus according to claim 1, wherein the processor is configured to determine that the data packet loss occurs in the network in a case where a sequence number of a third data packet is matched with the second identifier.

4. The monitoring apparatus according to claim 1, wherein the processor is configured to determine that the data packet loss occurs in the network in a case where a sequence number of a third data packet is higher than the second identifier and also is lower than a selective acknowledgment number of information stored immediately before.

5. The monitoring apparatus according to claim 2, wherein the processor is configured to:
  count up the number of the packet loss occurring in the reception node when determining that the packet loss occurs in the reception node, and
  output the counted-up number.

6. The monitoring apparatus according to claim 2, wherein the processor is configured to:
  count up the number of the packet loss occurring in the network when determining that the packet loss occurs in the network, and
  output the counted-up number.

7. The monitoring apparatus according to claim 1, wherein the identifier has an identifier for identifying data that the reception node requests the transmission node to transmit.

8. The monitoring apparatus according to claim 1, wherein the processor is configured to receive the data packets continuously transmitted from the transmission node to the reception node.

9. A non-transitory computer-readable recording medium storing a monitoring program for causing a computer to execute a process, the process comprising:
  receiving plural acknowledgment packets each including an identifier for identifying a packet and information indicating selective acknowledgment which are transmitted from a reception node that has received a data packet transmitted from a transmission node via a network to the transmission node via the network;
  determining that the data packet loss occurs in the reception node when a first identifier and first information included in a first acknowledgment packet among the plural acknowledgment packets are respectively matched with a second identifier and second information included in a second acknowledgment packet received after the first acknowledgment packet among the plural acknowledgment packets;
  determining that the data packet loss occurs in the network when the first identifier is matched with the second identifier and the first information is different from the second information;
  counting up a number of the packet loss occurring in the reception node and in the network;
  outputting the counted-up number of packet loss occurring in the reception node and in the network; and
  increasing a transmission buffer capacity and a reception buffer capacity of a network device that relays the packet in the network when the data packet loss occurs in the network.

10. A monitoring method executed by a monitoring apparatus that monitors a data packet loss, the monitoring method comprising:
  receiving plural acknowledgment packets each including an identifier for identifying a packet and information indicating selective acknowledgment which are transmitted from a reception node that has received a data packet transmitted from a transmission node via a network to the transmission node via the network;
  determining that the data packet loss occurs in the reception node when a first identifier and first information included in a first acknowledgment packet among the plural acknowledgment packets are respectively matched with a second identifier and second information included in a second acknowledgment packet received after the first acknowledgment packet among the plural acknowledgment packets;
  determining that the data packet loss occurs in the network when the first identifier is matched with the second identifier and the first information is different from the second information;
  counting up a number of the packet loss occurring in the reception node and in the network;
  outputting the counted-up number of packet loss occurring in the reception node and in the network; and
  increasing a transmission buffer capacity and a reception buffer capacity of a network device that relays the packet in the network when the data packet loss occurs in the network.

11. The monitoring method according to claim 10, the monitoring method further comprising:
  determining, on the basis of a sequence number of the received data packet and an identifier of the acknowledgment packet, that a total data amount of continuously received data packets exceeds a receivable amount of the reception node;
  storing, when the total data amount exceeds the receivable amount of the reception node and also the first identifier and the first information are respectively matched with the second identifier and the second information, a first sequence number of a first data packet received beyond the receivable amount and a second sequence number of a second data packet received after the first data packet in the memory;
  determining whether a sequence number of a received third data packet is lower than or equal to a maximum sequence number of the already received data packet, is higher than or equal to the first sequence number, and also is lower than or equal to the second sequence number, and
  determining that the packet loss occurs in the reception node when the sequence number of the third data packet is lower than or equal to the maximum sequence number of the already received data packet, is higher than or equal to the first sequence number, and also is lower than or equal to the second sequence number.

12. The monitoring method according to claim 10, the monitoring method further comprising:
  determining that the data packet loss occurs in the network when a sequence number of a third data packet is matched with the second identifier.

13. The monitoring method according to claim 10, the monitoring method further comprising:
   determining that the data packet loss occurs in the network when a sequence number of a third data packet is higher than the second identifier and also is lower than a selective acknowledgment number of information stored immediately before.

14. The monitoring method according to claim 11, the monitoring method further comprising:
   counting up the number of the packet loss occurring in the reception node when determining that the packet loss occurs in the reception node; and
   outputting the counted-up number.

15. The monitoring method according to claim 11, the monitoring method further comprising:
   counting up the number of the packet loss occurring in the network when determining that the packet loss occurs in the network; and
   outputting the counted-up number.

16. The monitoring method according to claim 10, wherein the identifier has an identifier for identifying data that the reception node requests the transmission node to transmit.

17. The monitoring method according to claim 10, the monitoring method further comprising:
   receiving the data packets continuously transmitted from the transmission node to the reception node.

18. The monitoring method according to claim 10, the monitoring method further comprising:
   receiving a packet having a receivable amount of the reception node which has been transmitted from the reception node to the transmission node; and
   determining whether the total data amount exceeds the receivable amount included in the received packet.

* * * * *